United States Patent
Youn et al.

(10) Patent No.: US 11,693,477 B2
(45) Date of Patent: Jul. 4, 2023

(54) LENS CLIP FOR RECEIVING USER LENS AND HEAD MOUNTED ELECTRONIC DEVICE FOR DETECTING WHETHER USER LENS IS INSERTED INTO LENS CLIP

(71) Applicant: Samsung Electronics Co., Ltd., Suwon-si (KR)

(72) Inventors: Yeotak Youn, Suwon-si (KR); Hyoungil Song, Suwon-si (KR); Jinchoul Lee, Suwon-si (KR); Kyuhyung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/544,382

(22) Filed: Dec. 7, 2021

(65) Prior Publication Data

US 2022/0179484 A1    Jun. 9, 2022

Related U.S. Application Data

(63) Continuation of application No. PCT/KR2021/017219, filed on Nov. 23, 2021.

(30) Foreign Application Priority Data

Dec. 7, 2020   (KR) ........................ 10-2020-0169433

(51) Int. Cl.
*G06F 3/01*    (2006.01)
*G02B 27/00*   (2006.01)
(Continued)

(52) U.S. Cl.
CPC ......... *G06F 3/013* (2013.01); *G02B 27/0093* (2013.01); *G02B 27/0176* (2013.01); *G06V 40/19* (2022.01)

(58) Field of Classification Search
CPC ..... A61F 9/08; G02B 27/017; G02B 27/0172; G02B 2027/0138; G02B 27/0093;
(Continued)

(56) References Cited

U.S. PATENT DOCUMENTS 9,348,142 B2    5/2016   Cho et al.
9,599,823 B2    3/2017   Cho et al.
(Continued)

FOREIGN PATENT DOCUMENTS

JP    2013-062794 A    4/2013
JP    2014-086905 A    5/2014
(Continued)

OTHER PUBLICATIONS

International Search Report and Written Opinion of the International Searching Authority dated Mar. 10, 2022, in connection with International Application No. PCT/KR2021/017219, 3 pages.

*Primary Examiner* — Nelson M Rosario

(57) ABSTRACT

Disclosed is a head mounted electronic device including a body, a lens clip having at least one opening defined therein, wherein the lens clip is disposed on the body so as to face toward a face of a user, an infrared-ray emissive device disposed on one portion of the body, an infrared-ray imaging device disposed on an opposite portion of the body to one portion thereof, wherein the infrared-ray imaging device acquires a first eyeball image obtained when infrared-ray emitting from the infrared-ray emissive device is reflected from an eyeball of the user, and a processor operatively connected to the infrared-ray emissive device and the infrared-ray imaging device.

19 Claims, 12 Drawing Sheets

(51) Int. Cl.
*G02B 27/01* (2006.01)
*G06V 40/19* (2022.01)

(58) Field of Classification Search
CPC ..... G02B 27/0176; G06F 3/011; G06F 3/048;
G06F 3/013; G06T 11/00; G06T 11/60;
G06T 19/006; G06T 5/001; G06V 10/20;
G06V 10/248; G06V 10/143; G06V
40/19; G06V 40/193; G09B 21/008;
H04N 13/344
See application file for complete search history.

(56) References Cited

U.S. PATENT DOCUMENTS

| | | | |
|---|---|---|---|
| 10,025,103 B2 | 7/2018 | Sugihara et al. | |
| 10,261,579 B2 | 4/2019 | Wang et al. | |
| 10,416,455 B2 | 9/2019 | Yi et al. | |
| 10,598,927 B2 | 3/2020 | Weindorf et al. | |
| 10,739,850 B2 | 8/2020 | Stafford et al. | |
| 11,187,923 B2 | 11/2021 | Dominguez et al. | |
| 11,402,644 B1* | 8/2022 | Wang | G02B 27/0179 |
| 2013/0063814 A1 | 3/2013 | Hsieh | |
| 2015/0212329 A1 | 7/2015 | Sugihara et al. | |
| 2016/0062454 A1 | 3/2016 | Wang et al. | |
| 2018/0357505 A1 | 12/2018 | Weindorf et al. | |
| 2019/0101980 A1 | 4/2019 | Stafford et al. | |
| 2019/0187490 A1* | 6/2019 | Dominguez | G02C 7/10 |
| 2020/0096775 A1 | 3/2020 | Franklin et al. | |
| 2022/0026743 A1 | 1/2022 | Dominguez et al. | |

FOREIGN PATENT DOCUMENTS

| | | |
|---|---|---|
| KR | 10-2015-0085342 A | 7/2015 |
| KR | 2016-0026429 A | 3/2016 |
| KR | 10-2016-0136674 A | 11/2016 |
| KR | 10-2071804 B1 | 3/2020 |
| KR | 10-2020-0100720 A | 8/2020 |

* cited by examiner

<501>

<502>

<503>

<601>

<602>

<603>

LENS CLIP FOR RECEIVING USER LENS AND HEAD MOUNTED ELECTRONIC DEVICE FOR DETECTING WHETHER USER LENS IS INSERTED INTO LENS CLIP

CROSS-REFERENCE TO RELATED APPLICATIONS

This application is a bypass continuation of International Application No. PCT/KR2021/017219, filed Nov. 23, 2021, in the Korean Intellectual Property Receiving Office and claiming priority to Korean Patent Application No. 10-2020-0169433, filed on Dec. 7, 2020, in the Korean Intellectual Property Office, the disclosures of which are incorporated by reference herein in their entireties.

BACKGROUND

1. Field

Various embodiments disclosed in the disclosure relate to an electronic device mounted on a user's head.

2. Description of Related Art

Various types of electronic devices that may be directly worn on a body are being developed. These devices may be generally referred to as wearable electronic devices. The wearable electronic device may include, for example, a head mounted display (HMD), a smart glass, a smart watch, a smart wristband, a contact lens type device, a ring-type device, a shoe-type device, a clothing-type device, or a glove-type device. Since such a wearable electronic device is directly worn on the body or clothes, portability thereof and accessibility of a user thereto may be dramatically improved.

Among the various examples of the wearable electronic devices, the head mounted display that may be mounted on a user's head may provide a realistic image to the user by providing a predetermined image at positions close to both eyes of the user.

The head mounted electronic device may track a user's eye, and may display a displayed image according to the user's eye or control the image, based on the eye tracking result. The head mounted electronic device may use an infrared-ray emissive device and an infrared-ray imaging device for user eye analysis. The infrared-ray imaging device may acquire an eyeball image obtained when infrared-ray emitting from the infrared-ray emissive device is reflected from a user's eyeball. The head mounted electronic device may analyze eye movement of the user based on the acquired eyeball image. However, a certain user may use an additional user lens (e.g., a power lens). Thus, when the user lens is used in the head mounted electronic device, additional reflected light may be unintentionally included in the acquired eyeball image. Accordingly, the eye analysis performance of the head mounted electronic device may be degraded. Further, in order to remove the additional reflected light from the user lens from the acquired eyeball image or perform separate processing, it is necessary to pre-determine whether the user lens is inserted into the head mounted electronic device.

Various embodiments disclosed in the disclosure may provide a lens clip including a lens detection structure.

Various embodiments disclosed in the disclosure may provide a head mounted electronic device capable of detecting whether a user lens is inserted, using a lens detection structure included in a lens clip for accurate user eye analysis.

SUMMARY

A head mounted electronic device according to certain embodiments disclosure in the disclosure may include a body, a lens clip having at least one opening defined therein, wherein the lens clip is disposed on the body so as to face toward a face of a user, an infrared-ray emissive device disposed on one portion of the body, an infrared-ray imaging device disposed on an opposite portion of the body to one portion thereof, wherein the infrared-ray imaging device acquires a first eyeball image obtained when infrared-ray emitting from the infrared-ray emissive device is reflected from an eyeball of the user, and a processor operatively connected to the infrared-ray emissive device and the infrared-ray imaging device, wherein the processor may transmit at least one first signal to the lens clip, and determine whether a user lens is inserted into the at least one opening, based on a second signal received in response to the first signal, upon determination that the user lens is not inserted into the at least one opening, execute an eye tracking algorithm based on the first eyeball image, upon determination that the user lens is inserted into the at least one opening, and execute the eye tracking algorithm based on a second eyeball image, wherein the second eyeball image is obtained by removing an additional reflected light image resulting from the user lens from the first eyeball image.

Further, a lens clip to be mounted on a head mounted electronic device according to certain embodiments disclosure in the disclosure may include a housing having at least one opening defined therein, a protrusion disposed in a portion of the housing so as to protrude toward the at least one opening, and an internal wire electrically connected to the protrusion when a user lens is inserted into the at least one opening, wherein when the housing is mounted on the head mounted electronic device, the internal wire is electrically connected to a first electrode of the head mounted electronic device, and the protrusion is electrically connected to a second electrode of the head mounted electronic device.

Further, a head mounted electronic device according to certain embodiments disclosure in the disclosure may include a body, a lens clip having at least one opening defined therein, wherein the lens clip is disposed on the body so as to face toward a face of a user, wherein the lens clip includes a plurality of protrusions protruding toward the opening, an infrared-ray emissive device disposed on one portion of the body, an infrared-ray imaging device disposed on an opposite portion of the body to one portion thereof, wherein the infrared-ray imaging device acquires a first eyeball image obtained when infrared-ray emitting from the infrared-ray emissive device is reflected from an eyeball of the user, and a processor operatively connected to the infrared-ray emissive device and the infrared-ray imaging device, wherein the processor may transmit a plurality of first signals corresponding to the plurality of protrusions to the lens clip, determine whether a user lens is inserted into the opening, and a power range of the inserted user lens, based on a plurality of second signals received in response to the plurality of first signals, upon determination that the user lens is not inserted into the opening, execute an eye tracking algorithm, based on a first eyeball image, and upon determination that the user lens is inserted into the opening, execute the eye tracking algorithm, based on a second eyeball image, wherein the second eyeball image is obtained by removing an additional reflected light image resulting from the user lens and based on the power range of the user lens from the first eyeball image.

According to various embodiments disclosed in the disclosure, the head mounted electronic device may simply detect whether the user lens is inserted, using the lens detection structure included in the lens clip.

According to various embodiments disclosed in the disclosure, the head mounted electronic device may provide an accurate eye analysis based on the detection result of whether the user lens is inserted.

In addition to the above effects, various effects that are directly or indirectly identified based on the disclosure may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
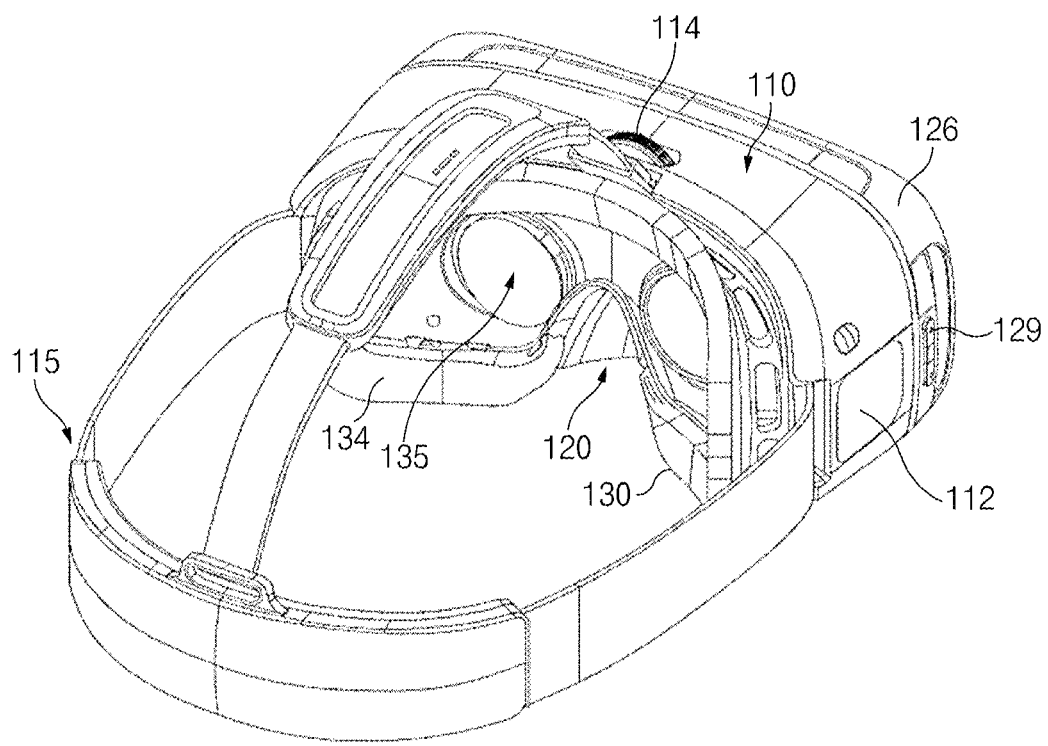
FIG. 1 is a perspective view showing a configuration of a head mounted electronic device according to certain embodiments.

FIG. 1 is a perspective view showing a configuration of a head mounted electronic device according to certain embodiments.

Referring to FIG. 1, a head mounted electronic device 100 may include a body 110 (e.g., a main frame) and a fastening part (or a mounting member) 115 (e.g., goggle band).

According to certain embodiments, the body 110 may be worn on at least a portion (e.g., a face) of a user's body, and may be supported on the user's face by various components. The fastening part 115 may be connected to the body 110 to fix the head mounted electronic device 100 to the user's body portion (e.g., a head). For example, the fastening part 115 may adjust a length of a band (or a Velcro tape) made of an elastic material so that the body 110 is in close contact with portions around the eyes of the user's face. Cushions may be attached to the band to provide a comfortable fit in consideration of long-term wear. In another example, the fastening part 115 may be implemented as eyeglass temples, helmets, or straps.

According to certain embodiments, a surface of the body 110 may include a face contact part 130 that is in contact with the user's face. For example, the face contact part 130 may have a structure corresponding to a curvature of the user's face, and may include at least a portion of an elastic body 134. The elastic body 134 may be made of at least one cushion material such as a sponge to provide a comfortable fit when the face contact part 130 contacts the user's face. The elastic body 134 may be made of one sponge, and may have a structure in which at least two sponges having different compressibility are bonded to each other. For example, the elastic body 134 may be embodied as a stack in which three sponge layers, for example, an upper sponge layer, a middle sponge layer, and a lower sponge layer are stacked, wherein each of the upper and lower layers may have low compressibility and the middle layer may have high compressibility.

According to certain embodiments, the body 110 may be easily worn on the user's face. For example, a shape or a structure of the body 110 may have an external shape that covers the user's eyes, and may have a nose-shaped recess 120 receiving therein the user's nose.

According to certain embodiments, each lens assembly 135 including at least one lens may be inserted into a portion of the body 110 facing toward each of the user's two eyes. For example, at least one surface of the lens assembly 135 may be exposed such that when the user wears the head mounted electronic device 100, the user's eyes may see a screen of a display device (e.g., a display device built into the body 110 or a display of an external electronic device mounted on the body 110).

According to certain embodiments, the body 110 may include the display device therein. For example, the display device may display various contents. For example, the display device may include a display device built into the body 110. In another example, the body 110 may be combined with the external electronic device (e.g., a smartphone), and the display device may include the display of the external electronic device). The body 110 may include a connector to communicate with the external electronic device. The external electronic device may be connected to the connector. The connector may include a USB connector that may be connected to a USB port, and may provide a signal of a graphical user interface to the external electronic device through the USB connector.

According to certain embodiments, the body 110 may include a control device (or a user input module) for controlling the head mounted electronic device 100 or the external electronic device. Alternatively, the control device may control the display device (e.g., the embedded display device or the display of the external electronic device). The control device may include at least one of a touch pad 112, a physical button 129, a touch key, a joystick, or a wheel key. For example, the touch pad 112 may display a graphical user interface (GUI). An audio GUI may control a volume of audio output from the body 110, and am image GUI may control the image displayed on the display device. Further, the touch pad 112 may receive an input directly touching the touch pad 112 or a hovering input as an example of a user's touch input.

According to certain embodiments, the body 110 may include a display position adjuster 114 for adjusting a position of the display device. For example, the display position adjuster 114 may be embodied in a form of a wheel or a dial. When the user turns the wheel or the dial as the display position adjuster 114, the display device (or the external electronic device) may move to adjust a distance between the display device and the user (e.g., the user's eyeball). As a result, the position of the display device may be adjusted such that the user may view and enjoy an image suitable for viewing or an image optimally displayed. In various examples, the display position adjuster 114 may be implemented in hardware or software. A plurality of display position adjusters may be provided on an outer surface of the body 110.

According to certain embodiments, the body 110 may include a cover 126. For example, the cover 126 may be coupled to the body 110 to protect the embedded display device or to allow the external electronic device to be more firmly supported on the body 110. The cover 126 may be physically coupled to the body 110 in a hook manner and may be coupled to the body 110 via a magnet or electromagnet. For example, the cover 126 may further include a window in a front face, and the window may enhance aesthetics based on various types of materials and colors thereof. The window may be made of a common plastic material such as PC (polycarbonate) or acrylate, or may be made of a ceramic material such as glass, sapphire, or transparent ceramic, or may be made of a metal material such as aluminum or SUS. When the window is made of a transparent material, colored colors may be contained therein, such that transparency may be adjusted.

Figure 2:
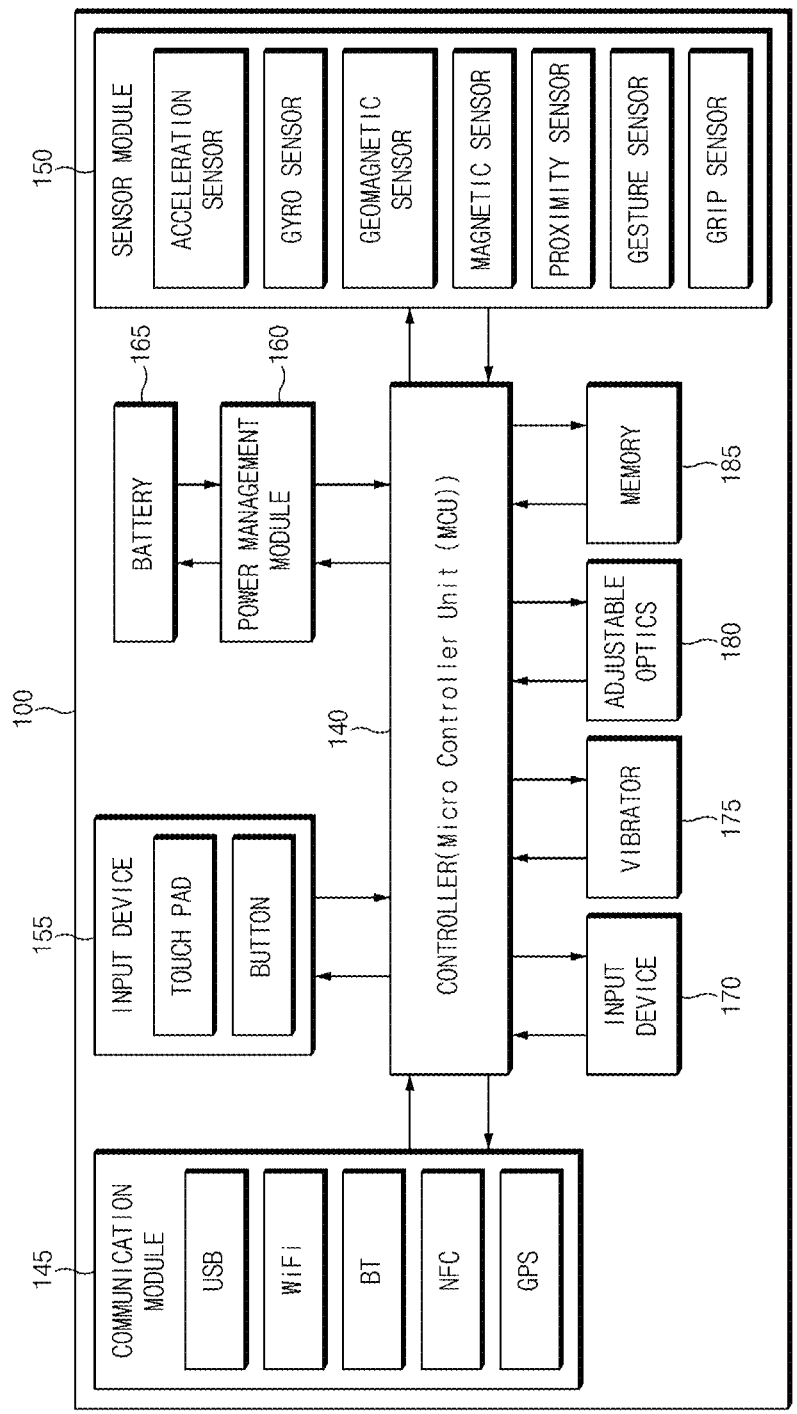
FIG. 2 is a block diagram showing the configuration of the head mounted electronic device of FIG. 1.

FIG. 2 is a block diagram showing the configuration of the head mounted electronic device of FIG. 1.

Referring to FIG. 2, the head mounted electronic device 100 may include a controller (or a micro controller unit: MCU) 140, a communication module 145, a sensor module 150, an input device 155, a power management module 160, a battery 165, an eye tracker 170, a vibrator 175, adjustable optics (or a lens assembly) 180 or a memory 185. In FIG. 2, other components (e.g., the display device) are not shown for convenience of illustration. In another embodiment, some of the components shown in FIG. 2 may be included in the body 110 of FIG. 1, while the other components thereof may be included in the external electronic device (e.g., a detachable smartphone).

According to certain embodiments, the controller (MCU) 140 may include a processor, and may execute an operating system (OS) or embedded S/W program to control a plurality of hardware components connected to the controller 140.

According to certain embodiments, the communication module 145 may electrically connect the body 110 of the head mounted electronic device 100 to the external electronic device, for example, a smartphone terminal, using wired and/or wireless communication to communicate data with each other. The communication module 145 may include a USB module, a WiFi module, a BT module, a NFC module, or a GPS module. At least some (e.g., at least two) of the WiFi module, the BT module, the GPS module, or the NFC module may be included in one integrated chip (IC) or one IC package.

According to certain embodiments, the sensor module 150 may measure a physical quantity or detect an operational state of the head mounted electronic device 100, and may convert the measured or sensed information into an electrical signal. The sensor module 150 may include, for example, at least one of an acceleration sensor, a gyro sensor, a geomagnetic sensor, a magnetic sensor, a proximity sensor, a gesture sensor, a grip sensor, and a biometric sensor. The head mounted electronic device 100 may detect a head movement of a user wearing the head mounted electronic device 100 using an acceleration sensor, a gyro sensor, and/or a geomagnetic sensor. The head mounted electronic device 100 may detect a wearing or non-wearing state of the head mounted electronic device 100 using a proximity sensor or a grip sensor. At least some components of the sensor module 150 may be included in the detachable external electronic device. The sensor module 150 may detect the user's wearing or non-wearing state based on a detecting result of at least one of IR recognition, pressure recognition, capacitance (or dielectric constant) change when the user wears the head mounted electronic device 100. The gesture sensor may detect the movement of the user's hand or finger and may receive the detected movement as an input operation of the head mounted electronic device 100. Additionally or alternatively, the sensor module 150 may recognize bio information about the user, using for example, a biometric sensor such as an olfactory sensor (E-nose sensor), an EMG sensor (electromyography sensor), an EEG sensor (electroencephalogram sensor), an ECG sensor (electrocardiogram sensor), or an iris sensor. The sensor module 150 may further include a control circuit for controlling at least one or more sensors included therein.

According to certain embodiments, the input device 155 may include a touch pad (e.g., the touch pad 112 in FIG. 1) or a button (e.g., the physical button 129 in FIG. 1). For example, the touch pad may recognize a touch input using at least one of a capacitive scheme, a pressure sensitive scheme, an infrared-ray scheme, and an ultrasonic scheme. Further, the touchpad may further include a control circuit. In the capacitive manner, physical contact or proximity recognition may be realized. The touchpad may further include a tactile layer. In this case, the touch pad may provide a tactile response to the user. The button may include, for example, a physical button, an optical key, or a keypad.

According to certain embodiments, the eye tracker 170 may track an eye of the user, for example, using at least one of an EOG sensor (electrical oculography), coil systems, dual purkinje systems, bright pupil systems, or dark pupil systems. Further, the eye tracker 170 may further include a micro camera for eye tracking. The adjustable optics 180 may measure a user's inter-pupil distance (IPD) and may adjust a distance of the lens (e.g., the lens assembly 135 in FIG. 1) and the position of the display (e.g., the embedded display device or the display of the external electronic device) so that the user may enjoy an image suitable for her/his physical condition. Further, the adjustable optics 180 may detect a direction of the user's eye and display or select information on an object that the user is looking at or reduce a size of data of the display image or display a region excluding a region that the user is looking at in the image at a low resolution level in order to give the user a sense of reality (foveated rendering).

According to certain embodiments, the memory 185 may include an internal or built-in memory or an external memory. For example, the built-in memory may include at least one of a volatile memory such as DRAM (dynamic RAM), SRAM (static RAM), SDRAM (synchronous dynamic RAM) or a non-volatile memory such as OTPROM (one time programmable ROM), PROM (programmable ROM), EPROM (erasable and programmable ROM), EEPROM (electrically erasable and programmable ROM), mask ROM, flash ROM, NAND flash memory, or NOR flash memory. According to certain embodiments, the internal or built-in memory may be an SSD solid state drive. The external memory may further include, for example, a flash drive such as CF (compact flash), SD (secure digital), Micro-SD (micro secure digital), Mini-SD (mini secure digital), xD (extreme digital) or a memory stick. The external memory may be functionally connected to the head mounted electronic device 100 via various interfaces. According to certain embodiments, the head mounted electronic device 100 may further include a storage device (or storage medium) such as a hard drive.

According to certain embodiments, the memory 185 may store therein a command or data generated from the controller 140, the communication module 145, the sensor module 150 and the input device 155. The memory 185 may store therein programming modules such as a kernel, middleware, an application programming interface (API) or an application.

For example, the kernel may control or manage system resources (e.g., the controller 140 or the memory 185) used to execute operations or functions implemented in the programming modules (e.g., the middleware, the API, or the application) other than the kernel. The kernel may provide an interface that may allow the middleware, the API, or the application to access and control or manage the individual components of the head mounted electronic device 100.

The middleware may play an intermediary role so that the API or the application may communicate with the kernel to send and receive data. With respect to work requests received from the applications, the middleware may assign a priority of using the system resources (e.g., the controller 140 or the memory 185) of the head mounted electronic device 100 to at least one of the applications to perform control (e.g., scheduling or load balancing) on the work requests.

The API may act as an interface that allows the application to control functions provided from the kernel or the middleware. For example, the API may include at least one interface or function (e.g., instruction) for control functions such as file control, window control, image processing, or character control.

The application may include a SMS/MMS application, an email application, a calendar application, a notification application, a health care application (e.g., an application for measuring an amount of exercise or blood sugar), or an environmental information application (e.g., an application for providing atmospheric pressure, humidity, or temperature information).

Additionally or alternatively, the application may be an application related to information exchange between the head mounted electronic device 100 and the external electronic device. For example, the application related to the information exchange may include a notification relay application for delivering specific information to the external electronic device or a device management application for managing the external electronic device. For example, the notification relay application includes a function to deliver notification information generated from other applications (e.g., the SMS/MMS application, the email application, the health management application, or the environment information application) of the head mounted electronic device 100 to the external electronic device.

Additionally or alternatively, the notification relay application may receive notification information from the external electronic device and provide the same to the user. For example, the device management application may manage (e.g., install, delete, or update) a function (e.g., turn on/turn off of the external electronic device itself (or some components thereof) or adjustment of brightness or resolution of the display thereof) for at least a portion of the external electronic device that communicates with the head mounted electronic device 100, or a service (e.g., call service or message service) provided from the external electronic device or the application operating in the external electronic device.

Figure 3:
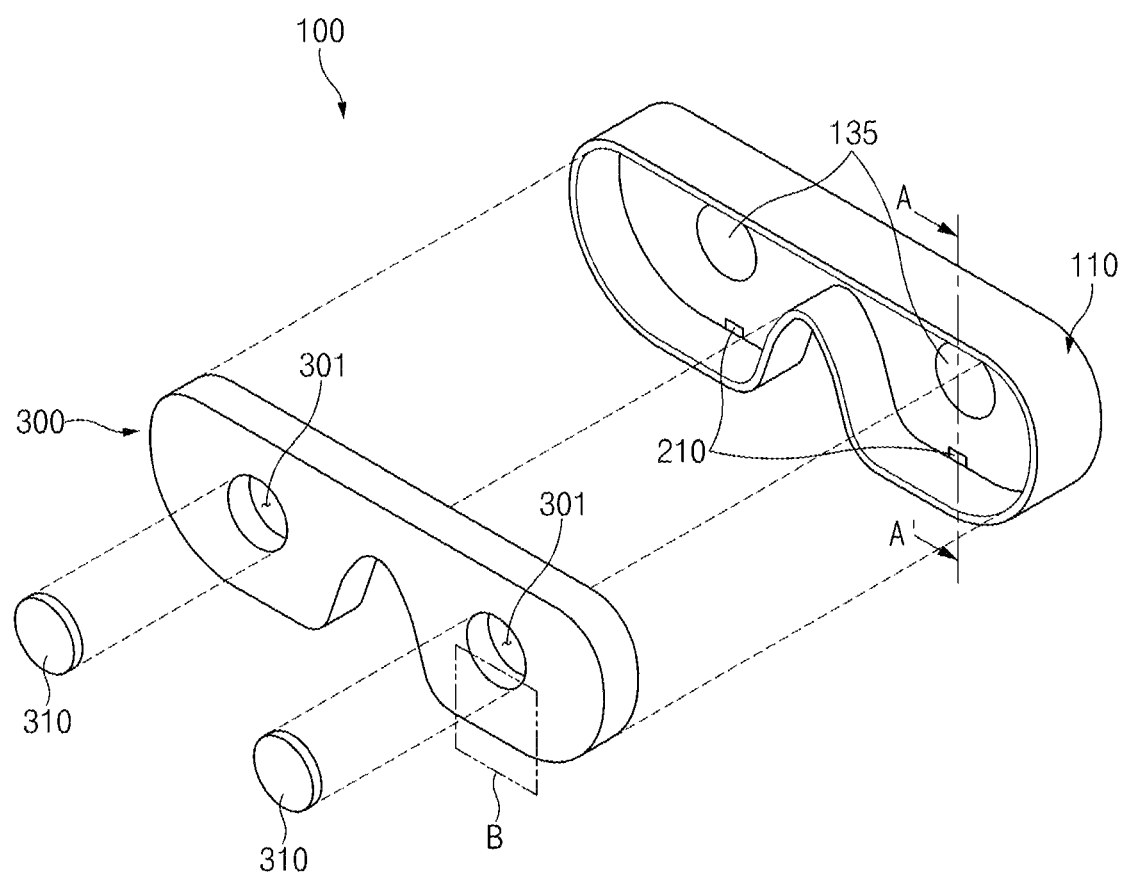
FIG. 3 is a perspective view showing a manner in which a lens clip and a user lens are mounted on a head mounted electronic device according to certain embodiments.
Figure 4:
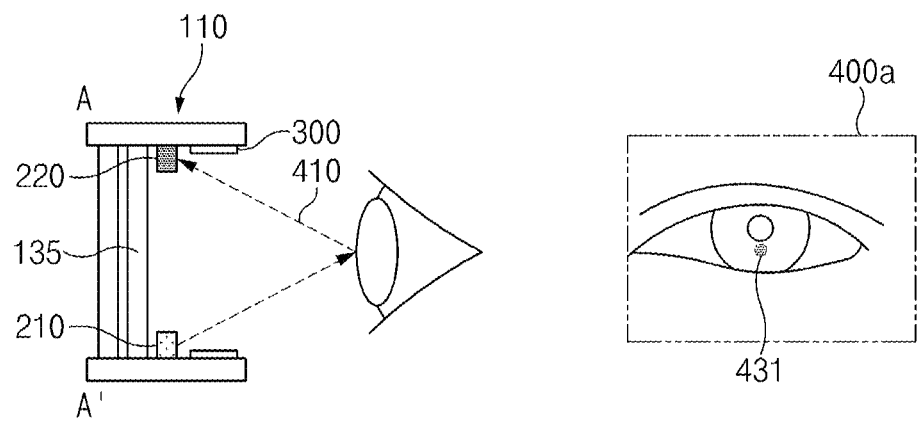
FIG. 4 is a diagram showing a method for acquiring an eyeball image based on a cross-sectional view taken along a line A-A' of FIG. 3.
Figure 4:
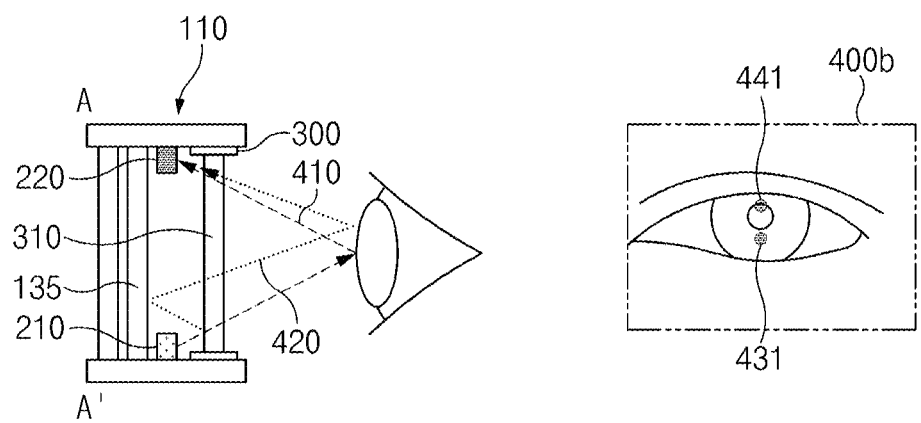

FIG. 3 is a perspective view showing a method in which a lens clip and a user lens are mounted on a head mounted electronic device according to certain embodiments. FIG. 4 is a diagram showing a method for acquiring an eyeball image based on a cross-sectional view taken along a line A-A' in FIG. 3.

Referring to FIG. 3 and FIG. 4, the head mounted electronic device 100 may include a lens clip 300 attachable to or detachable from the body 110 toward or in a direction away from the user's face. The lens clip 300 may include at least one opening 301 in a position corresponding to the lens assembly 135. An infrared-ray emissive device 210 and an infrared-ray imaging device 220 may be disposed between the lens assembly 135 and the lens clip 300. The infrared-ray emissive device 210 may be disposed on one portion of the body 110. The infrared-ray imaging device 220 may be disposed on the other portion of the body 110 (e.g., opposite to the infrared-ray emissive device 210). The infrared-ray emissive device 210 and the infrared-ray imaging device 220 may be included in the eye tracker 170 in FIG. 2.

According to certain embodiments, the head mounted electronic device 100 may track the user's eye based on an image captured of the user's eyeball. For example, the infrared-ray emissive device 210 may emit infrared-ray. The infrared-ray imaging device 220 may acquire the eyeball image obtained when the infrared-ray is reflected from the user's eyeball. The processor (e.g., the controller 140 or the eye tracker 170 in FIG. 2) of the head mounted electronic device 100 may apply the eyeball image to the eye tracking algorithm to acquire the user's eye tracking data. The processor may control the image displayed on the display device in a corresponding manner to the user's eye, based on the eye tracking data.

According to certain embodiments, a first state 401 of FIG. 4 refers to a state in which the lens clip 300 is not mounted on the body 110 or the lens clip 300 in which the user lens 310 (e.g., power lens) is not inserted is mounted on the body 110. In the first state 401, the infrared-ray emitting from the infrared-ray emissive device 210 may be reflected from the user's eyeball along a first pathway 410. In the first state 401, the infrared-ray imaging device 220 may acquire a first eyeball image 400*a*. The first eyeball image 400*a* may include a first reflected image 431. The processor may track the user's eye, based on the first reflected image 431.

According to certain embodiments, a second state 403 of FIG. 4 may represent a state in which the lens clip 300, in which the user lens 310 is inserted, is mounted on the body 110. For example, users of the head mounted electronic device 100 may have different eye sights. The user may insert the user lens 310 corresponding to his or her eyesight into the lens clip 300. However, in the second state 403 when the lens clip 300, in which the user lens 310 is inserted, is mounted on the body 110, the infrared-ray emitting from the infrared-ray emissive device 210 may be reflected from the user's eyeball along various pathways. For example, the infrared-ray may pass through the user lens 310 and then be reflected from the user's eyeball along the first pathway 410. Further, the infrared-ray may be first reflected from the user lens 310 and may be reflected from the user's eyeball along a second pathway 420. In the second state 403, the infrared-ray imaging device 220 may acquire a second eyeball image 400*b*. The second eyeball image 400*b* may include the first reflected image 431 resulting from the first pathway 410 as in the first eyeball image 400*a*. Further, the second eyeball image 400*b* may further include a second reflected image 441 that is not present in the first eyeball image 400*a*. In this connection, the eye tracking algorithm is set to track the user's eye based on the first reflected image 431. Thus, when performing the eye tracking algorithm based on the second eyeball image 400*b*, the eye tracking performance of the processor may be degraded.

According to certain embodiments, the lens clip 300 may include a lens detection structure. For example, the lens detection structure may include a protrusion toward an opening 301, and an electrical internal wire. The body 110 may include at least two electrodes. In the first state 401, the internal wire may not be connected to the two electrodes. In the second state 403, the protrusion may be pressed against the user lens 310, such that the internal wire may be connected to the two electrodes. Specific embodiments of the lens detection structure are described in FIG. 5 and FIG. 6.

According to certain embodiments, the processor may be connected with the two electrodes. For example, the processor may transmit a signal (or voltage, current) (e.g., a first signal) to one of the two electrodes. The processor may determine that the user lens 310 is inserted into the lens clip 300 when the processor has received a further signal (e.g., a second signal) through the other of the two electrodes. For example, in the first state 401, the internal wire is not connected to the two electrodes. Thus, the processor may determine that the user lens 310 is not inserted in the lens clip 300, and the processor may perform the eye tracking algorithm, based on the first eyeball image 400*a*. In the second state 403, the internal wire is connected to the two electrodes. Thus, the processor may determine that the user lens 310 is inserted into the lens clip, and thus remove the second reflected image 441 from the second eyeball image 400*b* and then perform the eye tracking algorithm based on the resulting image.

In FIG. 3 and FIG. 4, one infrared-ray emissive device 210 corresponding to the user's eyeball is shown. However, according to various embodiments, the head mounted electronic device 100 may include a plurality of infrared-ray emissive devices 210. For example, the plurality of infrared-ray emissive devices 210 may emit light beams based on a specified order or pattern. Thus, the user's eye tracking accuracy may be improved.

Figure 5:
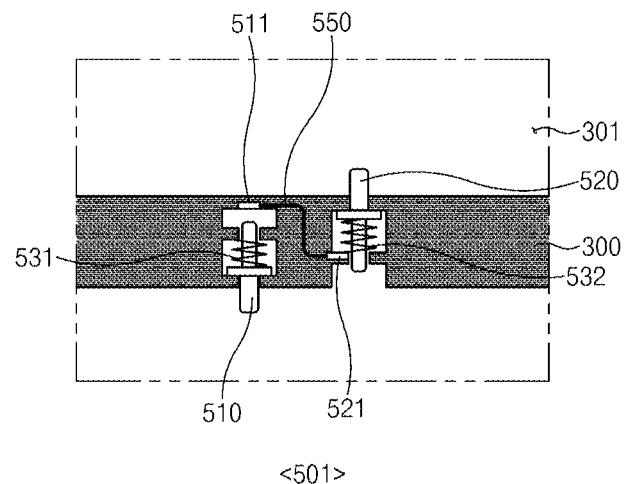
FIG. 5 is a view showing an example of a lens detection structure disposed in a B portion of FIG. 3.
Figure 5:
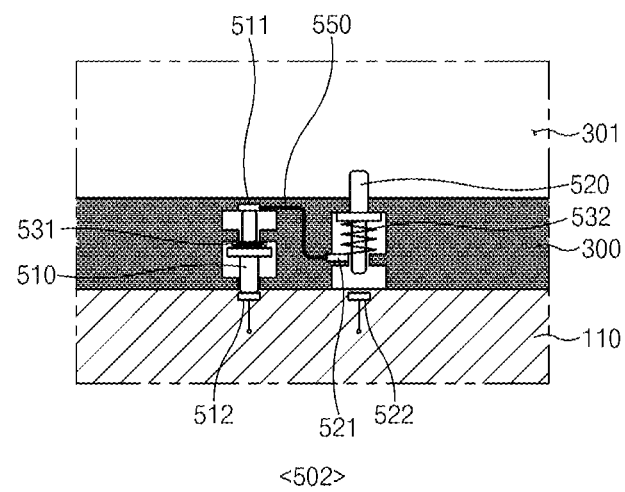
Figure 5:
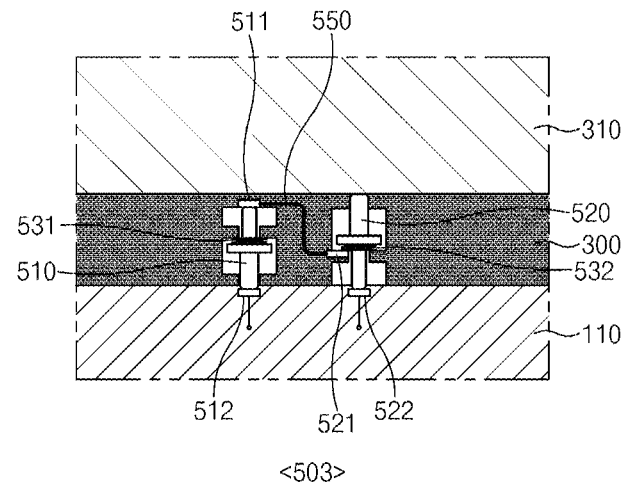

FIG. 5 is a view showing an example of the lens detection structure disposed on a B portion of FIG. 3.

Referring to FIG. 3 and FIG. 5, a portion (e.g., the portion B of FIG. 3) of the lens clip 300 may contain the lens detection structure. The lens detection structure may include at least one protrusion (e.g., a first pogo pin 510 and a second pogo pin 520, at least one elastic member (e.g., a first elastic member 531 and a second elastic member 532) and an internal wire 550. For example, the lens clip 300 may receive at least one protrusion (e.g., the first pogo pin 510 and the second pogo pin 520). The first pogo pin 510 may protrude due to the first elastic member 531 in a direction in which the lens clip is coupled to the body 110. The second pogo pin 520 may protrude in a direction in which the user lens 310 is coupled to the lens clip (e.g., toward the opening 301). The lens clip 300 may receive a first electrode 511 and a second electrode 521. The first electrode 511 and the second electrode 521 may be electrically connected to each other via the internal wire 550. The first electrode 511 may be disposed adjacent to the first pogo pin 510. The second electrode 521 may be disposed adjacent to the second pogo pin 520. At least one elastic member may include the first elastic member 531 and the second elastic member 532. In a state where the lens clip 300 and the body 110 are not coupled to each other, the first elastic member 531 may allow the first pogo pin 510 to protrude out of the lens clip 300. Further, the second elastic member 532 may allow the second pogo pin 520 to protrude out of the lens clip 300 in a state in which the lens clip 300 and the user lens 310 are not coupled to each other. The body 110 may receive at least two electrodes connected to the processor (e.g., the controller 140 or the eye tracker 170 in FIG. 2).

According to certain embodiments, in the first state 501, the user lens 310 may not be inserted into the opening 301 of the lens clip 300, and the lens clip 300 may not be mounted on (or coupled to) the body 110. For example, in the first state 501, the first pogo pin 510 and the second pogo pin 520 of the lens clip 300 may be in an unpressed state. The first electrode 511 and the first pogo pin 510 may not be electrically connected to (or not in contact with) each other, and/or the second electrode 521 and the second pogo pin 520 may not be electrically connected to (or not in contact with) each other.

According to certain embodiments, in the second state 502, the user lens 310 may not be inserted into the opening 301 of the lens clip 300, but the lens clip 300 may be mounted on the body 110. For example, the first pogo pin 510 may be pressed against the body 110 so that a portion of the first pogo pin 510 may be electrically connected to (or contact) the first electrode 511. The body 110 may include a third electrode 512 disposed at a position corresponding to that of the first pogo pin 510 (or the first electrode 511) and a fourth electrode 522 disposed at a position corresponding to that of the second pogo pin 520 (or the second electrode 521). In the second state 502, as the lens clip 300 is mounted on the body 110, one portion of the first pogo pin 510 may be pressed against the body 110, and an opposite portion of the first pogo pin 510 may be electrically connected to (or in contact with) the third electrode 512. However, in the second state 502, the second electrode 521 may not be connected to the fourth electrode 522.

According to certain embodiments, in the third state 503, the user lens 310 may be inserted into the opening 301 of the lens clip 300, and the lens clip 300 may be mounted on the body 110. For example, as in the second state 502, one portion of the first pogo pin 510 may be electrically connected to (or contact) the first electrode 511, and an opposite portion of the first pogo pin 510 may be electrically connected to (or in contact with) the third electrode 512. In the third state 503, the second pogo pin 520 may be pressed against the user lens 310 so that a portion of the second pogo pin 520 may be electrically connected (or contact) the second electrode 521, and an opposite portion of the second pogo pin 520 may be electrically connected to (or contact) the fourth electrode 522. Alternatively, one portion of the second pogo pin 520 may be electrically connected to (or contact) the second elastic member 532, and the second elastic member 532 may be electrically connected to (or in contact with) the second electrode 521. An opposite portion of the second pogo pin 520 may be electrically connected to (or in contact with) the fourth electrode 522.

According to certain embodiments, the processor may transmit the first signal (or voltage, current) to the third electrode 512 or the fourth electrode 522, and may receive the second signal (or voltage, current) through the fourth electrode 522 or the third electrode 512. For example, when the signal (or voltage, current) transmitted to the third electrode 512 is detected through the fourth electrode 522 (e.g., when the first signal and the second signal are the same as each other), the processor may determine that the lens clip 300 is mounted on the body 110 while the user lens 310 is inserted into the lens clip 300. Alternatively, when the signal (or voltage, current) transmitted to the fourth electrode 522 is detected through the third electrode 512 (e.g., when the first signal and the second signal are the same as each other), the processor may determine that the lens clip 300 is mounted on the body 110 while the user lens 310 is inserted into the lens clip 300.

Figure 6:
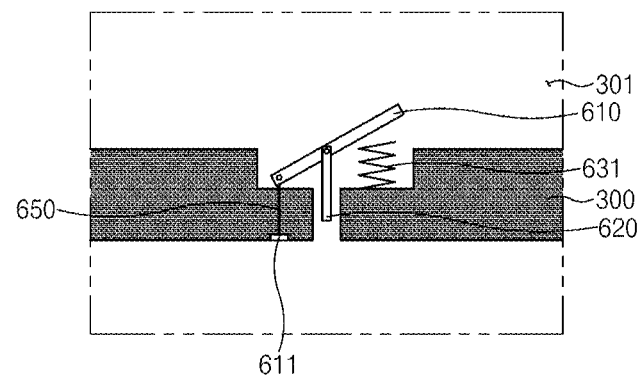
FIG. 6 is a view showing another example of a lens detection structure disposed in a B portion of FIG. 3.
Figure 6:
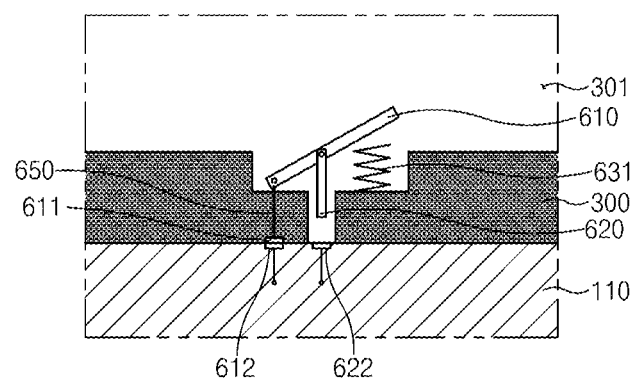
Figure 6:
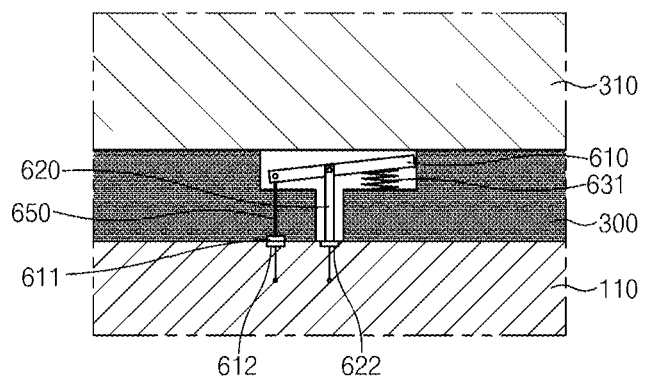

FIG. 6 is a view showing another example of a lens detection structure disposed in the B portion of FIG. 3.

Referring to FIG. 3 and FIG. 6, the portion (e.g., the B portion of FIG. 3) of the lens clip 300 may receive a lens detection structure. The lens detection structure may include a lever 610, a conductive bar 620, an elastic member 631, and an internal wire 650 connected to the lever 610. The lever 610 and the conductive bar 620 may be made of a conductive material (e.g., metal), and the at least a portion of the lever 610 and the conductive bar 620 may be electrically connected to each other. The lens clip 300 may receive a first electrode 611. The body 110 may include at least two electrodes (e.g., a second electrode 612 and a third electrode 622) connected to the processor (e.g., the controller 140 or the eye tracker 170 in FIG. 2).

According to certain embodiments, in the first state 601, the user lens 310 may not be inserted into the opening 301 of the lens clip 300, and the lens clip 300 may not be mounted on the body 110. The first electrode 611 may be exposed from one surface of the lens clip 300 and in a direction in which the lens clip is coupled to the body 110. For example, the first electrode 611 of the lens clip 300 may be electrically connected to (or contact) the second electrode 612 of the body 110 when the lens clip 300 is coupled to the body 110. The internal wire 650 may be connected to the first electrode 611 and one end of the lever 610. An opposite end of the lever 610 may protrude due to the elastic member 631 in a direction in which the user lens 310 is coupled to the lens clip (e.g., toward the opening 301). The conductive bar 620 may be connected to the portion of the lever 610.

According to certain embodiments, in the second state 602, the user lens 310 may not be inserted into the opening 301 of the lens clip 300, and the lens clip 300 may be mounted on the body 110. For example, the body 110 may include the second electrode 612 and the third electrode 622. The second electrode 612 may be electrically connected to (or in contact with) the first electrode 611. However, in the second state 602, the conductive bar 620 may not be electrically connected to (or contact) the third electrode 622.

According to certain embodiments, in the third state 603, the user lens 310 may be inserted into the opening 301 of the lens clip 300, and the lens clip 300 may be mounted on the body 110. For example, as in the second state 602, the second electrode 612 may be electrically connected to (or contact) the first electrode 611. Further, due to the insertion of the user lens 310 into the lens clip, a portion of the lever 610 may be pressed, and the conductive bar 620 may be electrically connected to (or contact) the third electrode 622. Accordingly, the second electrode 612 and the third electrode 622 may be electrically connected to each other through the internal wire 650, the lever 610, and the conductive bar 620.

According to certain embodiments, the processor may transmit the first signal (or voltage, current) to the second electrode 612 or the third electrode 622, and may receive the second signal (or voltage, current) through the third electrode 622 or the second electrode 612. For example, when the signal (or voltage, current) transmitted to the second electrode 612 is detected through the third electrode 622 (e.g., when the first signal and the second signal are the same as each other), the processor may determine that the lens clip 300 is coupled to the body 110 while the user lens 310 is inserted into the opening 301 of the lens clip 300. Alternatively, when the signal (or voltage, current) transmitted to the third electrode 622 is detected through the second electrode 612 (e.g., when the first signal and the second signal are the same as each other), the processor may determine that the lens clip 300 is coupled to the body 110 while the user lens 310 is inserted into the opening 301 of the lens clip 300.

Figure 7:
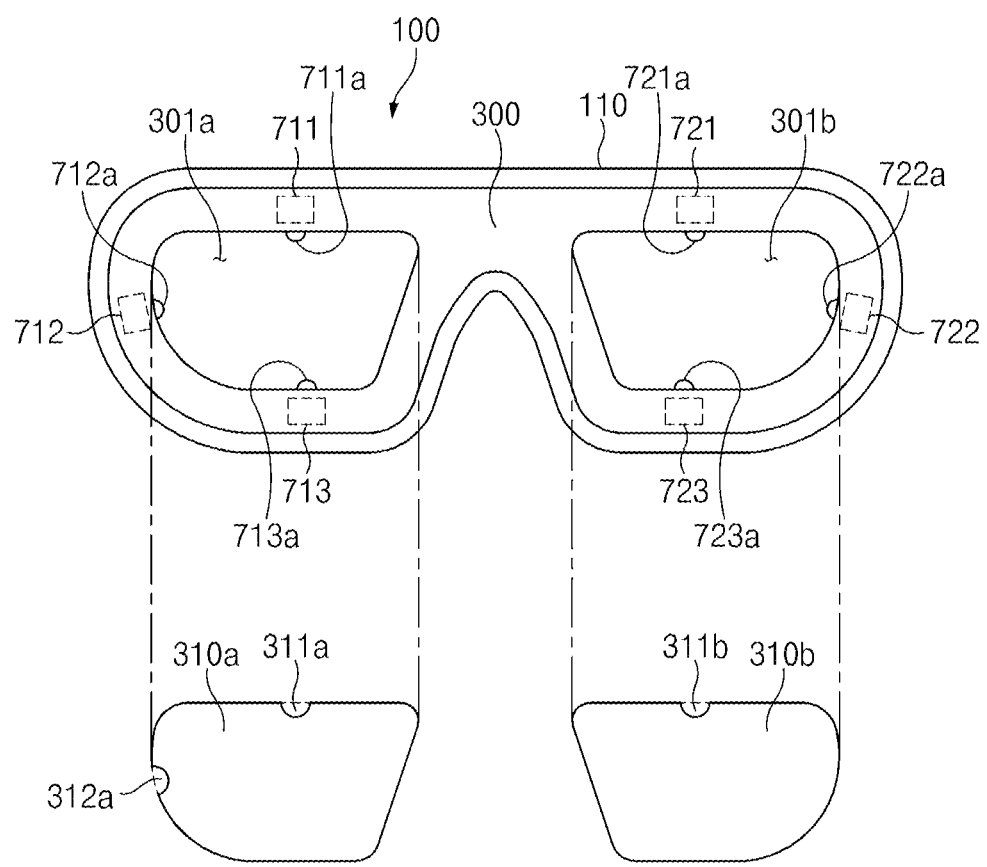
FIG. 7 is a view showing a lens clip according to certain embodiments.

FIG. 7 is a view showing a lens clip according to certain embodiments.

Referring to FIG. 7, the lens clip 300 may include a plurality of lens detection structures 711, 712, 713, 721, 722, and 723. The head mounted electronic device 100 may determine a mounted or dismounted state of the user lens (e.g., a first user lens 310a or a second user lens 310b) and a power range of the user lens using the plurality of lens detection structures 711, 712, 713, 721, 722, and 723.

According to certain embodiments, the first lens detection structure 711, the second lens detection structure 712 and the third lens detection structure 713 may be disposed around a first opening 301a of the lens clip 300. Each of the first lens detection structure 711, the second lens detection structure 712, and the third lens detection structure 713 may include the lens detection structure of FIG. 5 or FIG. 6. The first lens detection structure 711, the second lens detection structure 712, and the third lens detection structure 713 may respectively include protrusions 711a, 712a, and 713a (e.g., the second pogo pin 520 in FIG. 5 or the lever 610 in FIG. 6) protruding toward the first opening 301a.

According to certain embodiments, the fourth lens detection structure 721, the fifth lens detection structure 722, and the sixth lens detection structure 723 may be disposed around a second opening 301b of the lens clip 300. Each of the fourth lens detection structure 721, the fifth lens detection structure 722, and the sixth lens detection structure 723 may include the lens detection structure of FIG. 5 or FIG. 6. The fourth lens detection structure 721, the fifth lens detection structure 722 and the sixth lens detection structure 723 may respectively include protrusions 721a, 722a, and 723a (e.g., the second pogo pin 520 in FIG. 5 or the lever 610 in FIG. 6) protruding toward the second opening 301b.

According to certain embodiments, the processor (e.g., the controller 140 or the eye tracker 170 in FIG. 2) of the head mounted electronic device 100 may determine the power range of the first user lens 310a or the second user lens 310b, based on the number or positions or combinations thereof of the protrusions pressed due to the insertion of the first user lens 310a or the second user lens 310b into the opening. For example, when one of the protrusions is pressed, the processor may determine that the power of the user lens is in a first power range. When two of the protrusions are pressed, the processor may determine that the power of the user lens is in a second power range which is different from the first power range. When three of the protrusions are pressed, the processor may determine that the power of the user lens is in a third power range different from the first power range and the second power range. In another example, when the protrusion of only the first lens detection structure 711 or the fourth lens detection structure 721 is pressed, the processor may determine that the power of the user lens is in a first power range. When the protrusion of only the second lens detection structure 712 or the fifth lens detection structure 722 is pressed, the processor may determine that the power of the user lens is in a second power range which is different from the first power range. When the protrusion of only the third lens detection structure 713 or the sixth lens detection structure 723 is pressed, the processor may determine that the power of the user lens is in a third power range different from the first power range and the second power range. A method of removing the second reflected image 441 from the second eyeball image 400b in FIG. 4 may be performed based on the first power range, the second power range or the third power range. Thus, the processor may obtain accurate eye tracking data.

According to certain embodiments, the number and/or positions of recesses defined in the first user lens 310a or the second user lens 310b may vary depending on embodiments. For example, an edge of the first user lens 310a or the second user lens 310b may have no recess or may include at least one recess. For example, the first user lens 310a may include a first recess 311a and a second recess 312a. The first recess 311a may be formed to correspond to a shape of the protrusion 711a of the first lens detection structure 711. The second recess 312a may be formed to correspond to a shape of the protrusion 712a of the second lens detection structure 712. When the first user lens 310a is inserted into the first opening 301a, the protrusions 711a and 712a of the first lens detection structure 711 and the second lens detection structure 712 may not be pressed, while only the protrusion 713a of the third lens detection structure 713 may be pressed. In another example, the second user lens 310b may include a third recess 311b. The third recess 311b may be formed to correspond to a shape of the protrusion 721a of the fourth lens detection structure 721. When the second user lens 310b is inserted into the second opening 301b, the protrusions 721a of the fourth lens detection structure 721 may not be pressed, while protrusions 722a and 723a of the fifth lens detection structure 722 and the sixth lens detection structure 723 may be pressed.

Figure 8A:
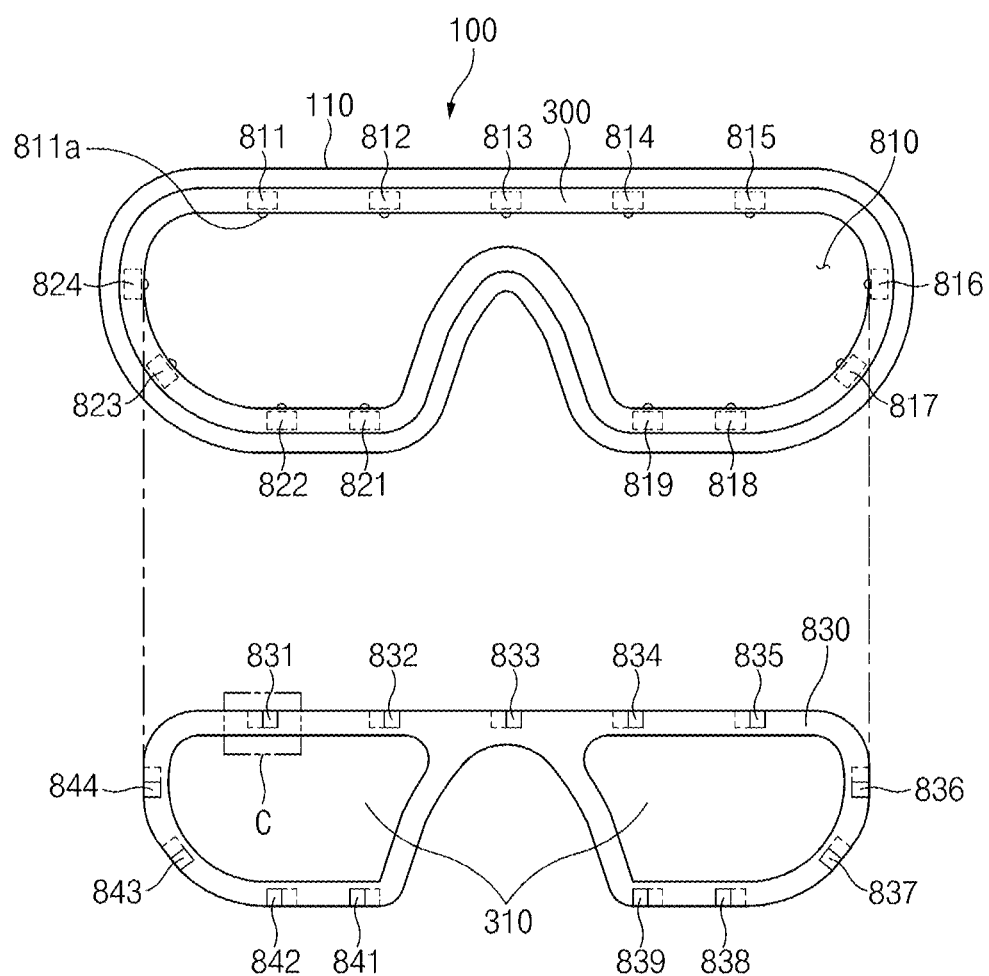
FIG. 8A is a view showing a lens clip according to another embodiment.
Figure 8B:
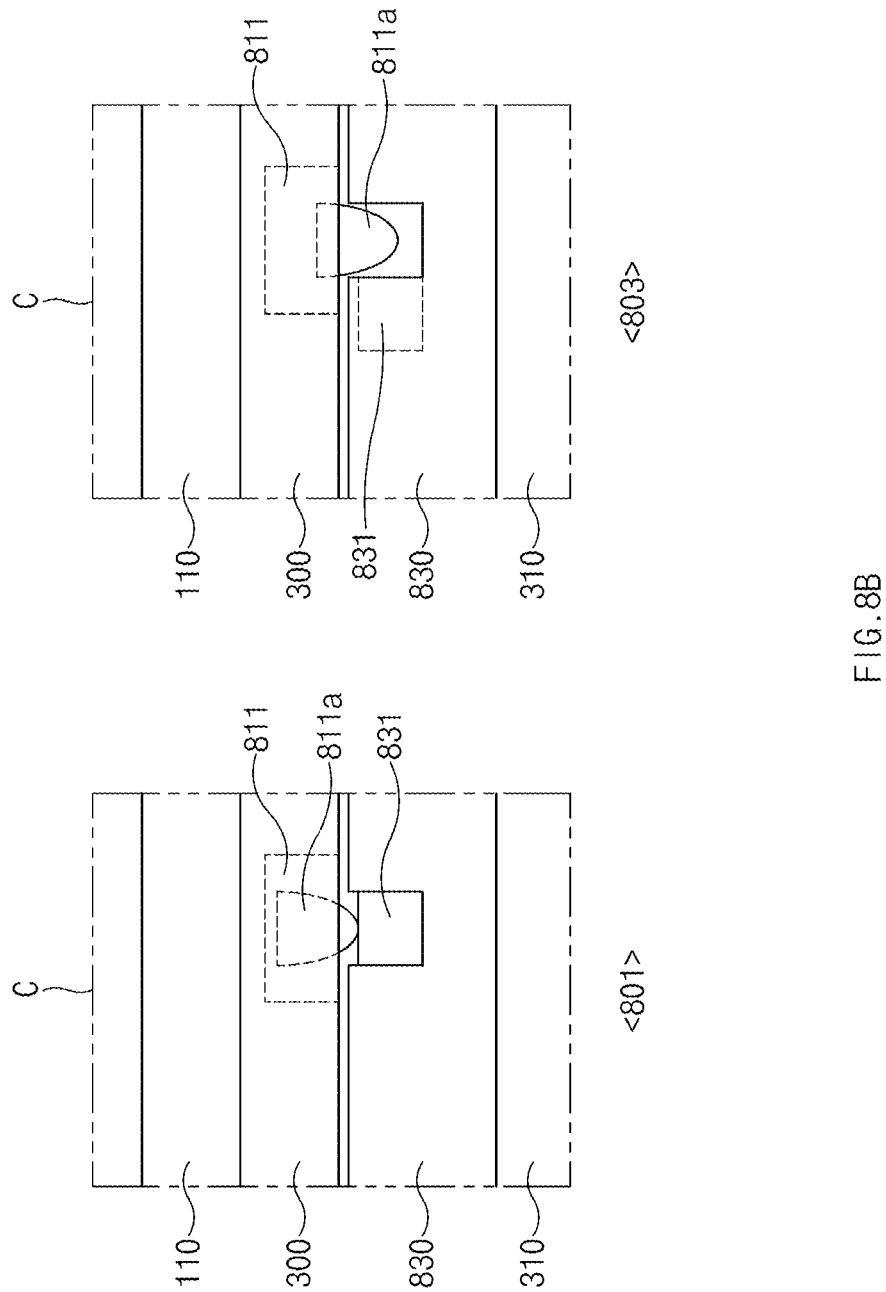
FIG. 8B is a diagram exemplarily showing one of a plurality of recess structures of FIG. 8A.

FIG. 8A is a view showing a lens clip according to another embodiment. FIG. 8B is a diagram exemplarily showing one of a plurality of recess structures of FIG. 8A (e.g., a C portion of FIG. 8A).

Referring to FIG. 8A, the head mounted electronic device 100 may include a first lens clip 300 (e.g., a main lens clip) and a second lens clip 830 (e.g., an auxiliary lens clip). The first lens clip 300 may be mounted to the body 110, and may include an opening 810 into which the second lens clip 830 may be inserted. The second lens clip 830 may be mounter into the opening 810 of the first lens clip 300. The user lens 310 may be inserted into the second lens clip 830.

According to certain embodiments, the first lens clip 300 may include a plurality of lens detection structures 811, 812, 813, 814, 815, 816, 817, 818, 819, 821, 822, 823, and 824. For example, each of the plurality of lens detection structures 811, 812, 813, 814, 815, 816, 817, 818, 819, 821, 822, 823, and 824 may include the lens detection structure of FIG. 5 or FIG. 6. The body 110 may include electrodes (e.g., the third electrode 512, and the fourth electrode 522 of FIG. 5 or the second electrode 612, and the third electrode 622 of FIG. 6) corresponding to the plurality of lens detection structures 811, 812, 813, 814, 815, 816, 817, 818, 819, 821, 822, 823, and 824 included in the first lens clip 300. The processor (e.g., the controller 140 or the eye tracker 170 in FIG. 2) of the head mounted electronic device 100 may be electrically connected to the electrodes corresponding to the plurality of lens detection structures included in the first lens clip 300. The second lens clip 830 may include a plurality of recess structures 831, 832, 833, 834, 835, 836, 837, 838, 839, 841, 842, 843, and 844 corresponding to the plurality of lens detection structures 811, 812, 813, 814, 815, 816, 817, 818, 819, 821, 822, 823, and 824. For example, each of the plurality of recess structures 831, 832, 833, 834, 835, 836, 837, 838, 839, 841, 842, 843, and 844 may have a structure in which a portion has a slide shape and slides to form a recess.

For example, in a first state 801 of FIG. 8B, the first recess structure 831 does not form a recess, and may be disposed to correspond to the protrusion 811a of the first lens detection structure 811. Accordingly, the protrusion 811a of the first lens detection structure 811 may be pressed against the first recess structure 831, and thus the electrodes included in the first lens detection structure 811 may be electrically connected to each other. In the second state 803 of FIG. 8B, the first recess structure 831 may slide into the second lens clip 830 to form a recess. Accordingly, the protrusion 811a of the first lens detection structure 811 may not be pressed and may protrude into the recess, and thus the electrodes included in the first lens detection structure 811 may be disconnected from each other. In FIG. 8B, the first lens detection structure 811 is exemplarily shown based on the C portion of FIG. 8A. Each of the remaining recess structures 832, 833, 834, 835, 836, 837, 838, 839, 841, 842, 843, and 844 may be formed in the same manner as the first lens detection structure 811. In various embodiments, in FIG. 8B, the first recess structure 831 may slide in a left direction from the recess. However, the first recess structure 831 may slide in a right direction or downwardly from the recess or may be detachable from the recess.

According to certain embodiments, the head mounted electronic device 100 may detect the power range of the user lens 310 in a more precise manner, compared to the case of FIG. 7. For example, the processor (e.g., the controller 140 or the eye tracker 170 in FIG. 2) of the head mounted electronic device 100 may determine a power range of the user lens 310 based on pressed states of the protrusions of the plurality of lens detection structures 811, 812, 813, 814, 815, 816, 817, 818, 819, 821 822, 823, and 824. For example, each of the plurality of lens detection structures 811, 812, 813, 814, 815, 816, 817, 818, 819, 821, 822, 823, and 824 may correspond to a power range. A recess structure (e.g., the first recess structure 831) of the plurality of recess structures 831, 832, 833, 834, 835, 836, 837, 838, 839, 841, 842, 843, and 844 may be set as a recess by the user. When the second lens clip 830 is mounted to the first lens clip 300, the protrusion of the lens detection structure (e.g., the first lens detection structure 811) corresponding to the recess structure (the first recess structure 831) set to the recess may not be pressed, while the protrusions of the remaining lens detection structures may be pressed against the second lens clip 830. The processor may determine the power range of the user lens 310 based on a pattern (e.g., the position) of the protrusion that is not pressed (or pressed) against the second lens clip 830. In another example, the processor may determine the power range of the user lens 310 based on the pattern (e.g., the number, positions, or combinations thereof) of the protrusions pressed against the second lens clip 830 among the protrusions of the plurality of lens detection structures 811, 812, 813, 814, 815, 816, 817, 818, 819, 821, 822, 823, and 824. The pattern of at least one pressed protrusion indicates the power range of the user lens 310. In this connection, at least one of the plurality of recess structures 831, 832, 833, 834, 835, 836, 837, 838, 839, 841, 842, 843, and 844 may be set as a recess by a user.

According to certain embodiments, the power range detected according to the combination of the pressed protrusions of the plurality of lens detection structures 811, 812, 813, 814, 815, 816, 817, 818, 819, 821, 822, 823, and 824 may be subdivided. Accordingly, the method of removing the second reflected image 441 from the second eyeball image 400b of FIG. 4 may be performed in a more precise manner. Thus, the processor may acquire more accurate eye tracking data, compared to the approach of FIG. 7. Further, in the approach of FIG. 7, the recess (e.g., the first recess 311a, the second recess 312a or the third recess 311b must be machined directly into the user lens (e.g., the first user lens 310a or the second user lens 310b). In the approach of FIG. 8A, there is no need to machine the recess into the user lens 310, but the user may simply set at least one of the plurality of recess structures 831, 832, 833, 834, 835, 836, 837, 838, 839, 841, 842, 843, and 844 as a recess.

Figure 9:
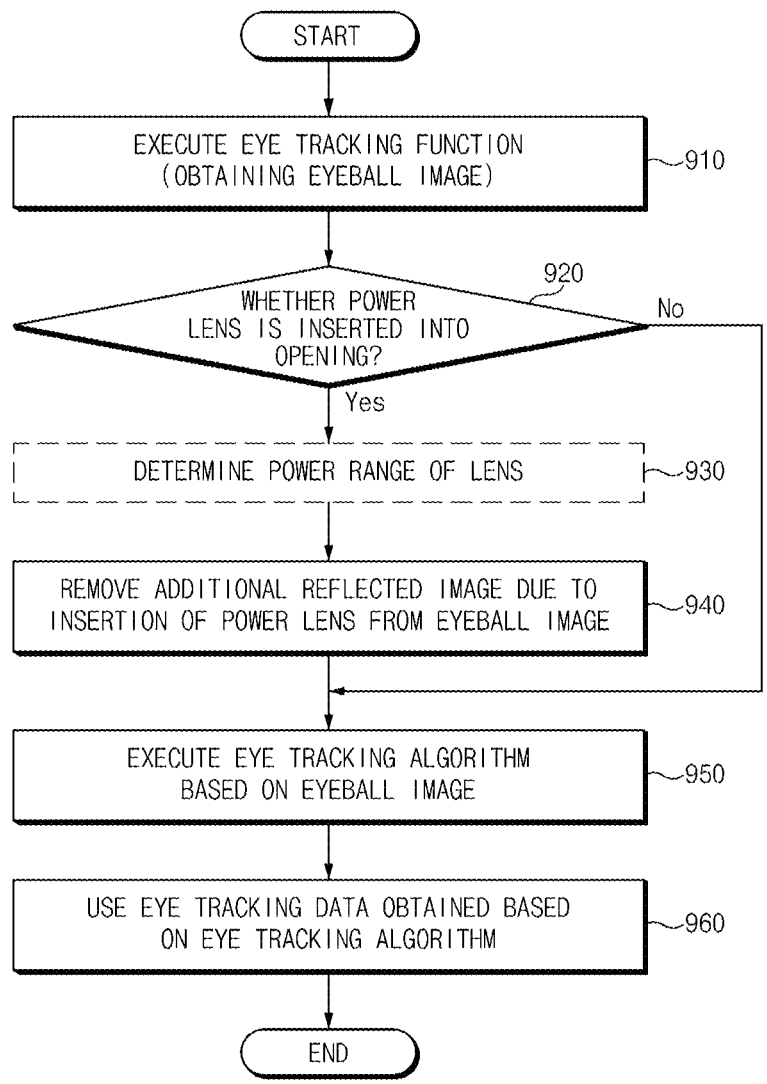
FIG. 9 is a flowchart showing an eye tracking method performed by a head mounted electronic device according to certain embodiments.

FIG. 9 is a flowchart showing the eye tracking method performed by the head mounted electronic device according to certain embodiments.

Referring to FIG. 1 to FIG. 9, the head mounted electronic device 100 may determine the mounted or dismounted state of the user lens 310 and acquire accurate eye tracking data based on the determination result.

According to certain embodiments, in operation 910, the processor (e.g., the controller 140 or the eye tracker 170 in FIG. 2) may execute the eye tracking function. For example, the processor may obtain the eyeball image (e.g., the first eyeball image 400a or the second eyeball image 400b in FIG. 4) using the infrared-ray emissive device 210 and the infrared-ray imaging device 220 in FIG. 4.

According to certain embodiments, in operation 920, the processor may determine the mounted or dismounted state of the user lens 310. For example, the lens clip 300 to be mounted on the body 110 may include at least a lens detection structure (e.g., the lens detection structure in FIG. 5 or FIG. 6). The processor may determine whether the user lens 310 is inserted into the opening of the lens clip based on the method described in FIG. 5 to FIG. 8A. When it is determined that the user lens 310 is inserted into the lens clip 300, the processor may perform operation 930. When it is determined that the user lens 310 is not inserted into the lens clip 300, the processor may perform operation 950.

According to certain embodiments, in operation 930, the processor may identify the power of the user lens 310. Operation 930 may be optionally performed. For example, operation 930 may be performed when the power range of the user lens 310 may be determined as in the lens clip 300 of FIG. 7 or FIG. 8A. The processor may identify the power range of the user lens 310 (or the first user lens 310a and the second user lens 310b) according to the method described in FIG. 7 or FIG. 8A.

According to certain embodiments, in operation 940, the processor may remove the additional reflected image (e.g., the second reflected image 441 in FIG. 4) due to the insertion of the user lens 310 from the eyeball image (e.g., the second eyeball image 400b in FIG. 4) as acquired in operation 910. For example, when the lens clip 300 of FIG. 7 or FIG. 8A is used, the processor may remove the additional reflected image in a precise manner, based on the power range of the user lens 310 identified in operation 930.

According to certain embodiments, in operation 950, the processor may execute the eye tracking algorithm based on the eyeball image. For example, when the user lens 310 is not inserted into the lens clip as in the first state 401 in FIG. 4, the processor may execute the eye tracking algorithm, based on the eyeball image (e.g., the first eyeball image 400a in FIG. 4) obtained in operation 910. When the user lens 310 is inserted in the lens clip as in the second state 403 in FIG. 4, the processor may execute the eye tracking algorithm based on the eyeball image from which the additional reflected image is removed in operation 940.

According to certain embodiments, in operation 960, the processor may use the eye tracking data obtained based on the eye tracking algorithm to control the display device (e.g., the display device built into the body 110 or the display of the external electronic device mounted on the body 110). For example, the processor may adjust the position of the display device based on the eye tracking data. Alternatively, the processor may control the screen displayed on the display device based on the eye tracking data. For example, the processor may change a size of the screen displayed on the display device or change contents of the screen based on the eye tracking data.

As described above, the head mounted electronic device 100 disclosed in the disclosure may identify whether the user lens 310 is inserted into the lens clip 300 using the lens detection structure in the lens clip 300 while not using a separate optical device and control method. The head mounted electronic device 100 may identify whether the user lens 310 is inserted into the lens clip to improve the accuracy of the eye tracking algorithm. Further, the head mounted electronic device 100 may identify the power range of the user lens 310 to further improve the accuracy of the eye tracking algorithm.

Figure 10:
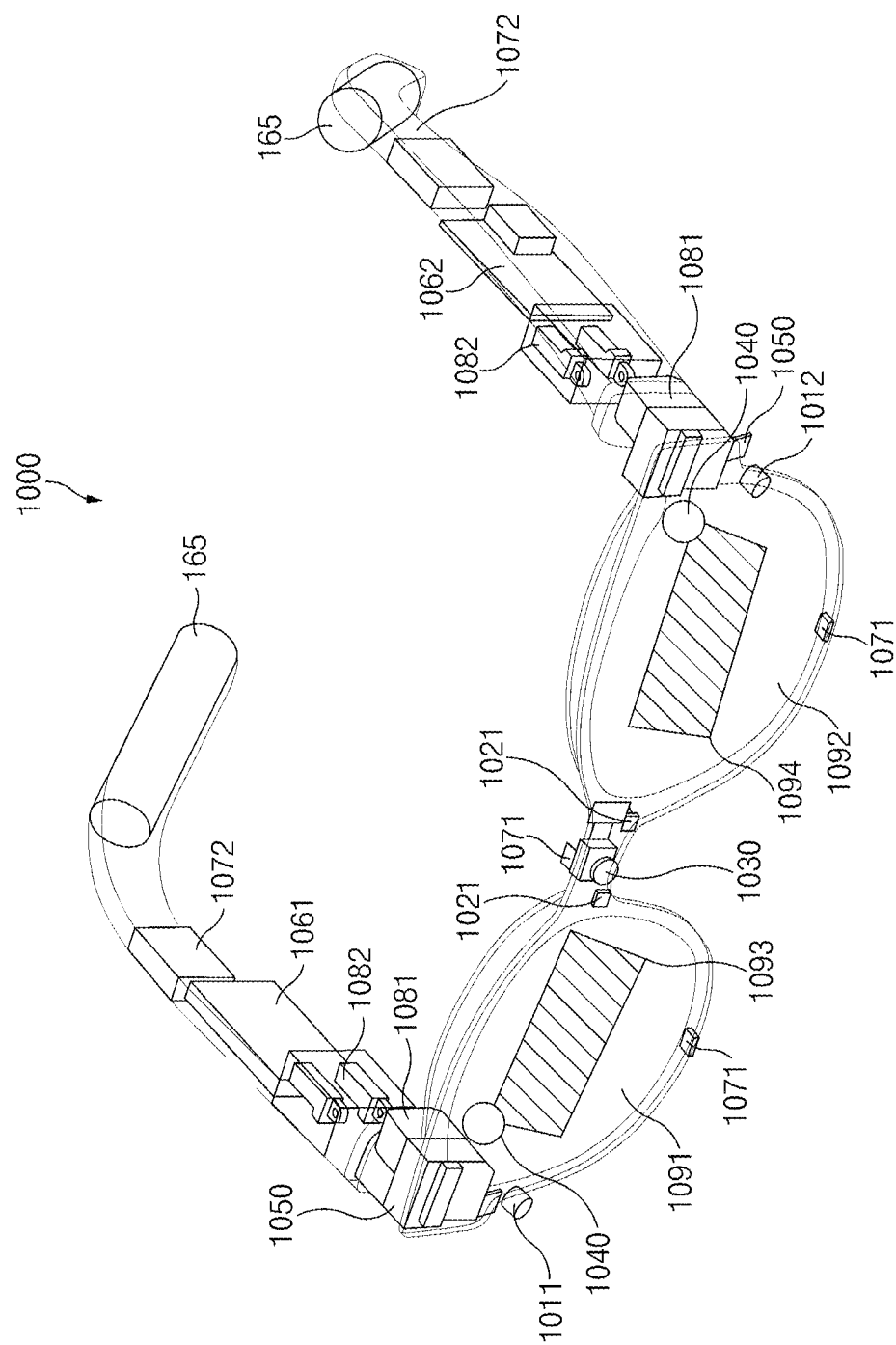
FIG. 10 is a diagram showing a wearable electronic device according to various embodiments.

FIG. 10 is a view showing a wearable electronic device 1000 (e.g., the wearable electronic device 100 of FIG. 1) according to certain embodiments. The wearable electronic device 1000 may include a light outputting module 1081, transparent members 1091 and 1092, display members 1093 and 1094, first cameras 1011 and 1012, a second camera 1021, a third camera 1030, an input optical member 1040, a light emitter 1050, and PCBs 1061 and 1062. Further, the wearable electronic device 1000 may include an input device 1071 such as a microphone, a sound output device 1072 such as a speaker, the battery 165, and a hinge 1082.

In certain embodiments, the light outputting module 1081 may include, for example, a liquid crystal display (LCD), a digital mirror display (DMD), a liquid crystal on silicon display (LCoS), an organic light emitting diode (OLED) or a micro light emitting diode (micro LED). Although not shown, when the light outputting module 1081 is embodied as one of the liquid crystal display, the digital mirror display, or the liquid crystal on silicon display, the wearable electronic device 1000 may include a light source for irradiating light to the display members 1093 and 1094. In another embodiment, when the light outputting module 1081 is of a self light-emission type, for example, is embodied as either the organic light emitting diode (OLED) or the micro light emitting diode (micro LED), the wearable electronic device 1000 does not include a separate light source, and may provide high-quality virtual images to the user. In certain embodiments, when the light outputting module 1081 is implemented as the organic light emitting diode (OLED) or the micro light emitting diode (micro LED), the light source is unnecessary, so that the wearable electronic device 1000 may be lightweight. The user may use the wearable electronic device 1000 while wearing the same on a face thereof. The transparent members 1091 and 1092 may be made of a glass plate, a plastic plate, or a polymer. The transparent members 1091 and 1092 may be transparent or semi-transparent. The transparent members 1091 and 1092 may include a first transparent member 1091 and a second transparent member 1092. The first transparent member 1091 may face toward the user's right eye, and the second transparent member 1092 may face toward the user's left eye. When the light outputting module 1081 is a transparent device (e.g., a transparent display), the first transparent member 1091 and the second transparent member 1092 may be respectively disposed at a position facing toward the user's eyes.

In certain embodiments, the display members 1093 and 1094 may provide the user with a screen displayed from the light outputting module 1081. The display members 1093 and 1094 may be respectively built inside the transparent members 1091 and 1092. The display members 1093 and 1094 may include the first display member 1093 and the second display member 1094. The first display member 1093 may be built inside the first transparent member 1091, and the second display member 1094 may be built inside the second transparent member 1092.

In certain embodiments, the first cameras 1011 and 1012 may recognize the user's body and/or a space. The first cameras 1011 and 1012 may track the user's head. The first cameras 1011 and 1012 may detect and track the user's hand. The first cameras 1011 and 1012 may recognize the space. The first cameras 1011 and 1012 may be 3DoF or 6DoF cameras. The first cameras 1011 and 1012 may be GS (Global shutter) cameras. The first cameras 1011 and 1012 may have a stereo structure for body tracking and/or space recognition. The first two cameras 1011 and 1012 should have substantially the same specification and/or performance. In order to detect and track fast hand motion and fine movement such as finger movement, each of the first cameras 1011 and 1012 may be embodied as the GS camera having superior performance (e.g., image drag), compared to RS (rolling shutter) cameras. According to various embodiments, each of the first cameras 1011 and 1012 may be embodied as the RS camera. The first cameras 1011 and 1012 may perform space recognition for 6DoF and perform a SLAM function via depth imaging. The first cameras 1011 and 1012 may perform a user gesture recognition function.

In certain embodiments, the second camera 1021 may detect and track a pupil. The second camera 1021 may be a camera for ET (Eye Tracking). The second camera 1021 may position a center of a virtual image projected on the wearable electronic device 1000 according to a direction which the eyes of the wearer of the wearable electronic device 1000 gaze. The second camera 1021 may be a GS camera. When the second camera 1021 is the GS camera, the second camera 1021 may detect the pupil and track the fast pupil movement without screen drag. The second camera 1021 may include a camera for left eye and a camera for right eye. The second camera 1021 may have a stereo structure. The second camera 1021 may include two cameras having substantially the same performance and specification.

In certain embodiments, the third camera 1030 may image an external object (e.g., a person, an object, and/or a background). The third camera 1030 may be a high resolution camera to realize HR (High Resolution) or PV (Photo Video). The third camera 1030 may be equipped with functions for obtaining high-quality images, such as an auto focus (AF) function, and/or an optical image stabilization (OIS) function. The third camera 1030 may be a camera with high color-related performance. The third camera 1030 may be a GS camera or an RS camera.

In certain embodiments, the input optical member 1040 may guide light into a waveguide. A detailed description of an operation of the input optical member 1040 will be described in conjunction with FIG. 11.

In certain embodiments, the light emitter 1050 may be disposed inside a second housing portion. The light emitter 1050 may be disposed to face toward a front of the second housing portion 220. The light emitter 1050 may be disposed adjacent to the hinge 1082. However, the present disclosure is not limited thereto. The light emitter 1050 may be disposed adjacent to a center of the second housing portion 220. The light emitter 1050 may supplement ambient brightness when imaging with the first cameras 1011 and 1012. The light emitter 1050 may supplement ambient brightness when it is not easy to detect an object to be imaged in a dark environment or due to mixing of multiple light sources and reflected light. The light emitter 1050 may be used as an aid to facilitate detection of eye gaze when imaging the pupil with the second camera 1021. The light emitter 1050 may be an IR LED that emits light of an infrared-ray wavelength.

In certain embodiments, the PCBs 1061 and 1062 may be disposed inside a first housing portion or a third housing portion. The PCBs 1061 and 1062 may be disposed adjacent to temples, respectively. The PCBs 1061 and 1062 may be electrically connected to FPCB. The PCBs 1061 and 1062 may transmit an electrical signal to the modules (e.g., the first cameras 1011 and 1012, the second camera 1021, the third camera 1030, the light outputting module 1081, the input device 1071, and the sound output device 1072) inside the wearable electronic device 1000 via the. The PCBs 1061 and 1062 may include a first PCB 1061 and a second PCB 1062. The first PCB 1061 and the second PCB 1062 may be electrically connected to each other. For example, an interposer may be disposed between the first PCB 1061 and the second PCB 1062. The first PCB 1061 and the second PCB 1062 may transmit and receive the electrical signal to and from each other.

Figure 11:
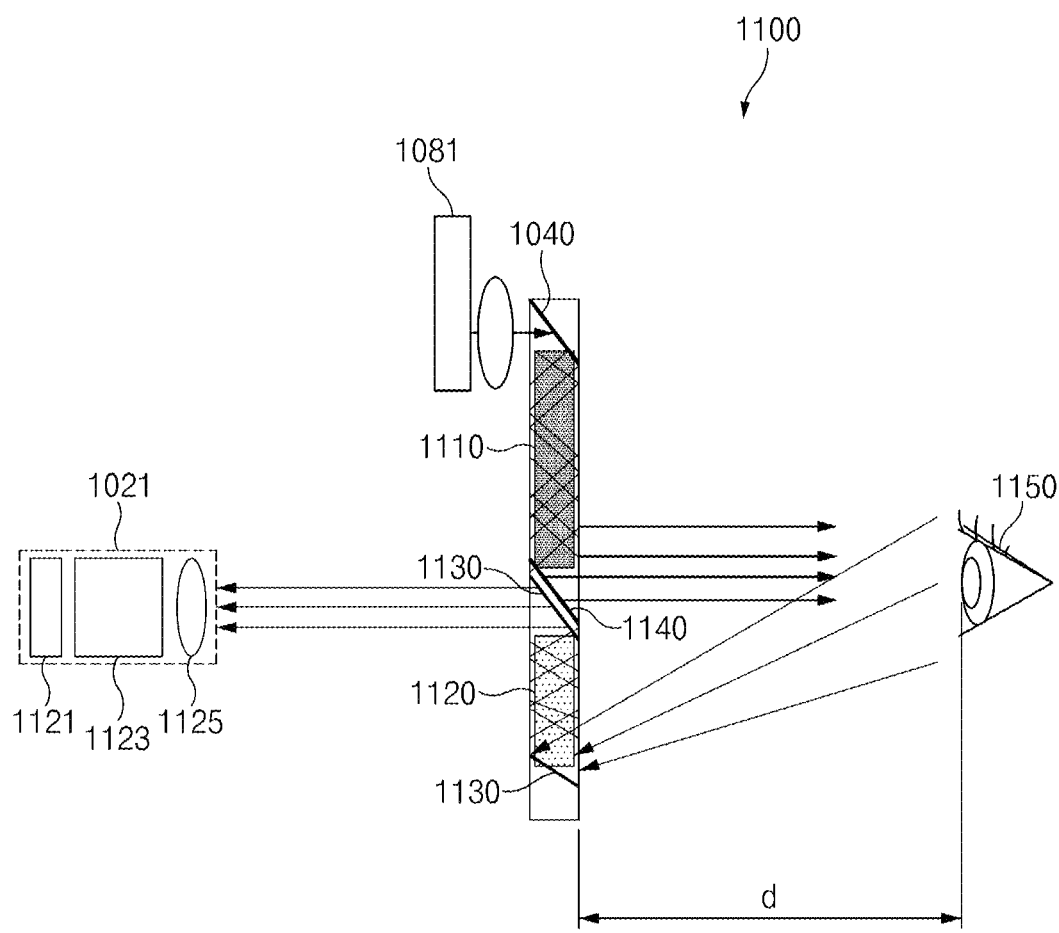
FIG. 11 is a view showing an optical structure of a wearable electronic device according to various embodiments.

FIG. 11 is a diagram 1100 showing an optical structure of the wearable electronic device (e.g., the wearable electronic device 1000 of FIG. 10) according to certain embodiments.

In certain embodiments, a first waveguide 1110 may be received inside a glass (e.g., the transparent members 1091 and 1092 in FIG. 10). The first waveguide 1110 may deliver the light generated from the light outputting module 1081 to the user's eyes 1150. The first waveguide 1110 may be made of glass, plastic, or polymer. A nano-pattern may be formed on an inner surface or an outer surface of the first waveguide 1110. The nanopattern may include a grating structure of a polygonal or curved shape.

In certain embodiments, the light output from the light outputting module 1081 may be incident on one end of the first waveguide 1110 through the input optical member 1040. The light incident to the one end of the first waveguide 1110 may be propagated inside a second waveguide 1120 as a waveguide of the light outputting module 1081 via the nano-pattern.

In certain embodiments, the light propagated inside the second waveguide 1120 may be provided to a user. The second waveguide 1120 may include a free-form prism. The second waveguide 1120 may include at least one diffractive element (e.g., DOE (Diffractive Optical Element) or HOE (Holographic Optical Element)) or a reflective element (e.g., a reflected mirror). The second waveguide 1120 may guide the incident light to the user's eye 1150 via the diffractive element or the reflective element and provide the light to the user.

In certain embodiments, the diffractive element may include the input optical member 1040 and an output optical member 1140. The reflective element may include a total internal reflection (TIR) element. For example, light emitting from the light outputting module 1081 may be guided to the first waveguide 1110 through the input optical member 1040. The light traveling inside the first waveguide 1110 may be guided toward the user's eye 1150 through the output optical member 1140. The user may recognize the screen using the light emitting toward the user's eyes 1150.

In certain embodiments, the light propagated inside the second waveguide 1120 may be split by a beam splitter 1130. At least some of the light beams split by the beam splitter 1130 may be guided to the second camera 1021. The second camera 1021 may process the light beams guided to the second camera 1021 using an ET sensor 1121, an ET optical member 1123, and a lens 1125.

According to various embodiments, a head mounted electronic device (e.g., the head mounted electronic device 100) may include a body (e.g., the body 110 or the main frame), a lens clip (e.g., the lens clip 300) including at least one opening (e.g., the opening 301) and disposed on the body so as to face toward the user's face, an infrared-ray emissive device (e.g., the infrared-ray emissive device 210) disposed on a portion of the body, an infrared-ray imaging device (e.g., the infrared-ray imaging device 220) disposed on an opposite portion of the body to a portion thereof, wherein the infrared-ray imaging device acquires a first eyeball image obtained when infrared-ray emitting from the infrared-ray emissive device is reflected from an eyeball of the user, and a processor (e.g., the controller 140 or the eye tracker 170) operatively connected to the infrared-ray emissive device and the infrared-ray imaging device. The processor may transmit at least one first signal (e.g., the first signal transmitted to the lens detection structure) to the lens clip, and determine whether a user lens (e.g., the user lens 310 or the power lens) is inserted into the at least one opening, based on a second signal (e.g., the second signal received from the lens detection structure) received in response to the first signal, upon determination that the user lens is not inserted into the at least one opening, execute an eye tracking algorithm based on the first eyeball image (e.g., the first eyeball image 400a, and upon determination that the user lens is inserted into the at least one opening, execute the eye tracking algorithm based on a second eyeball image (e.g., the second eyeball image 400b), wherein the second eyeball image is obtained by removing an additional reflected light image (e.g., the second reflected image 441) resulting from the user lens from the first eyeball image.

According to various embodiments, when the second signal is not received, the processor may determine that the user lens is not inserted into the at least one opening, wherein when the second signal is received, the processor may determine that the user lens is inserted into the at least one opening.

According to various embodiments, when the second signal is different from the first signal, the processor may determine that the user lens is not inserted into the at least one opening, wherein when the second signal is identical with the first signal, the processor may determine that the user lens is inserted into the at least one opening.

According to various embodiments, the body may include a first electrode (e.g., the third electrode 512 or the second electrode 612) and a second electrode (e.g., the fourth electrode 522 or the third electrode 622) facing toward the lens clip. When the user lens is inserted into the at least one opening, the lens clip may electrically connect the first electrode and the second electrode to each other. When the user lens is not inserted into the at least one opening, the lens clip may electrically disconnect the first electrode and the second electrode from each other.

According to various embodiments, the lens clip may include an internal wire (e.g., the internal wire 550 or the internal wire 650) that is electrically connected to the first electrode when the lens clip is disposed on the body, and a protrusion (e.g., the second pogo pin 520, the lever 610, the protrusions 711a, 712a, and 713a, the protrusions 721a, 722a, and 723a, and the protrusion 811a) protruding toward the at least one opening, wherein the protrusion is electrically connected to the second electrode and the internal wire when the user lens is inserted into the at least one opening.

According to various embodiments, the lens clip may include a first pogo pin (e.g., the first pogo pin 510) electrically connected to the first electrode and the internal wire when the lens clip is disposed on the body, wherein the first pogo pin protrudes from the lens clip toward the first electrode under an elastic force of a first elastic member (e.g., the first elastic member 531), and a second pogo pin (e.g., the second pogo pin 520) acting as the protrusion, wherein the second pogo pin protrudes from the lens clip towards the at least one opening under an elastic force of a second elastic member (e.g., the second elastic member 532).

According to various embodiments, the device may further include a third electrode (e.g., the first electrode 611) electrically connected to one end of the internal wire, wherein the third electrode is brought into contact with the first electrode when the lens clip is disposed on the body, a lever (e.g., the lever 610) acting as the protrusion and electrically connected to an opposite end of the internal wire to one end thereof, wherein the lever protrudes from the lens clip toward the at least one opening under an elastic force of an elastic member (e.g., the elastic member 631), and a conductive bar (e.g., the conductive bar 620) electrically connected to a portion of the lever, wherein the conductive bar is brought into contact with the second electrode when the user lens is inserted into the at least one opening.

According to various embodiments, a lens clip (e.g., the lens clip 300) that may be mounted on a head mounted electronic device (e.g., the head mounted electronic device 100) may include a housing having at least one opening (e.g., the opening 301), a protrusion (e.g., the second pogo pin 520, the lever 610, the protrusions 711a, 712a, and 713a, the protrusions 721a, 722a, and 723a, and the protrusion 811a) disposed in a portion of the housing so as to protrude toward the at least one opening, and an internal wire (e.g., the internal wire 550 or the internal wire 650) electrically connected to the protrusion when a user lens (e.g., the user lens 310 or a power lens is inserted into the at least one opening. When the housing is mounted on the head mounted electronic device, the internal wire is electrically connected to a first electrode (e.g., the third electrode 512 or the second electrode 612) of the head mounted electronic device, and the protrusion is electrically connected to a second electrode (e.g., the fourth electrode 522 or the third electrode 622) of the head mounted electronic device.

According to various embodiments, the lens clip may further include a third electrode (e.g., the first electrode 511) electrically connected to one end of the internal wire, a fourth electrode (e.g., the second electrode 521) electrically connected to the opposite end of the internal wire, a first elastic member (e.g., the first elastic member 531), a first pogo pin (e.g., the first pogo pin 510) protruding from the housing toward the first electrode under an elastic force of the first elastic member, a second elastic member (e.g., the second elastic member 532, and a second pogo pin (e.g., the second pogo pin 520) acting as the protrusion and protruding from the housing towards the at least one opening under an elastic force of the second elastic member.

According to various embodiments, when the housing is mounted on the head mounted electronic device, the first pogo pin is pressed against the head mounted electronic device and thus is brought into contact with the first electrode and the third electrode.

According to various embodiments, when the user lens is inserted into the at least one opening, the second pogo pin is pressed against the user lens and thus is brought into contact with the second electrode and the fourth electrode.

According to various embodiments, the second pogo pin is electrically connected to the fourth electrode via the second elastic member.

According to various embodiments, the lens clip may further include a third electrode (e.g., the first electrode 611) electrically connected to one end of the internal wire, an elastic member (e.g., the elastic member 631), a lever (e.g., the lever 610) electrically connected to an opposite end of the internal wire and protruding from the housing toward the at least one opening under an elastic force of the elastic member, and a conductive bar (e.g., the conductive bar 620) electrically connected to a portion of the lever.

According to various embodiments, when the housing is mounted on the head mounted electronic device, the third electrode is brought into contact with the first electrode.

According to various embodiments, when the user lens is inserted into the at least one opening, the lever is pressed against the user lens such that the conductive bar is brought into contact with the second electrode.

According to various embodiments, a head mounted electronic device may include a body, a lens clip having at least one opening (e.g., the first opening 301a, the second opening 301b or the opening 810) defined therein, wherein the lens clip is disposed on the body so as to face toward a face of a user, wherein the lens clip includes a plurality of protrusions (e.g., the protrusion 711a, 712a, and 713a, the protrusions 721a, 722a, and 723a, and the protrusion 811a) protruding toward the opening, an infrared-ray emissive device disposed on a portion of the body, an infrared-ray imaging device disposed on an opposite portion of the body to a portion thereof, wherein the infrared-ray imaging device acquires a first eyeball image obtained when infrared-ray emitting from the infrared-ray emissive device is reflected from an eyeball of the user, and a processor operatively connected to the infrared-ray emissive device and the infrared-ray imaging device. The processor may transmit a plurality of first signals corresponding to the plurality of protrusions to the lens clip, determine whether a user lens is inserted into the opening, and a power range of the inserted user lens, based on a plurality of second signals received in response to the plurality of first signals, upon determination that the user lens is not inserted into the opening, execute an eye tracking algorithm, based on a first eyeball image, and upon determination that the user lens is inserted into the opening, execute the eye tracking algorithm, based on a second eyeball image, wherein the second eyeball image is obtained by removing an additional reflected light image resulting from the user lens and based on the power range of the user lens from the first eyeball image.

According to various embodiments, upon determination that the user lens is inserted into the opening, the processor may determine the power range, based on a number, positions, or a combination thereof of specific protrusions among the plurality of protrusions, wherein the first and second signals related to each of the specific protrusions are identical with each other.

According to various embodiments, at least one protrusion pressed against the user lens among the plurality of protrusion outputs the second signal identical with the first signal.

According to various embodiments, the device may further include an auxiliary lens clip (e.g., the second lens clip 830) inserted into the lens clip, wherein the user lens is mounted on the auxiliary lens clip, wherein the auxiliary lens clip includes a plurality of recess structures (e.g., the plurality of recess structures 831, 832, 833, 834, 835, 836, 837, 838, 839, 841, 842, 843, and 844) corresponding to the plurality of protrusions. Each of the plurality of protrusions may be pressed or not pressed against each of the plurality of recess structures.

According to various embodiments, each of the plurality of recess structures may be constructed to be slidable into the auxiliary lens clip to form a recess.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 100 in FIGS. 1 and 2). For example, a processor (e.g., the controller 140 in FIG. 2) of the machine (e.g., the electronic device 100 in FIGS. 1 and 2) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A head mounted electronic device comprising:
a body;
a lens clip disposed on the body and including at least one opening defined therein,
an infrared-ray emissive device disposed the body and configured to emit an infrared-ray;
an infrared-ray imaging device disposed on the body, wherein the infrared-ray imaging device is configured to acquire a first eyeball image when the infrared-ray is reflected from an eyeball of a user; and a processor operatively connected to the infrared-ray emissive device and the infrared-ray imaging device,
wherein the processor is configured to:
transmit a first signal to the lens clip;
determine whether a user lens is inserted into the at least one opening, based on a second signal received in response to the first signal;
upon determination that the user lens is not inserted into the at least one opening, execute an eye tracking algorithm based on the first eyeball image; and
upon determination that the user lens is inserted into the at least one opening, execute the eye tracking algorithm based on a second eyeball image, wherein the second eyeball image is obtained by removing an additional reflected light image resulting from the user lens from the first eyeball image,
wherein the body includes a first electrode and a second electrode facing toward the lens clip, and
wherein the first electrode and the second electrode are electrically connected when the user lens is inserted into the at least one opening.

2. The device of claim 1, wherein:
when the second signal is not received, the processor is configured to determine that the user lens is not inserted into the at least one opening, and
when the second signal is received, the processor is configured to determine that the user lens is inserted into the at least one opening.

3. The device of claim 1, wherein:
when the second signal is different from the first signal, the processor is configured to determine that the user lens is not inserted into the at least one opening, and
when the second signal is identical with the first signal, the processor is configured to determine that the user lens is inserted into the at least one opening.

4. The device of claim 1 wherein:
the lens clip includes:
an internal wire electrically connected to the first electrode when the lens clip is disposed on the body; and
a protrusion protruding toward the at least one opening, and
the protrusion is electrically connected to the second electrode and the internal wire when the user lens is inserted into the at least one opening.

5. The device of claim 4, wherein the lens clip includes:
a first pogo pin electrically connected to the first electrode and the internal wire when the lens clip is disposed on the body, wherein the first pogo pin protrudes from the lens clip toward the first electrode under an elastic force of a first elastic member; and
a second pogo pin acting as the protrusion, wherein the second pogo pin protrudes from the lens clip towards the at least one opening under an elastic force of a second elastic member.

6. The device of claim 4, wherein the device further comprises:
a third electrode electrically connected to one end of the internal wire, wherein the third electrode is brought into contact with the first electrode when the lens clip is disposed on the body;
a lever acting as the protrusion and electrically connected to an opposite end of the internal wire to one end thereof, wherein the lever protrudes from the lens clip toward the at least one opening under an elastic force of an elastic member; and
a conductive bar electrically connected to a portion of the lever, wherein the conductive bar is brought into contact with the second electrode when the user lens is inserted into the at least one opening.

7. A lens clip to be mounted on a head mounted electronic device, the lens clip comprising:
a housing having at least one opening defined therein;
a protrusion disposed in a portion of the housing so as to protrude toward the at least one opening; and
an internal wire electrically connected to the protrusion when a user lens is inserted into the at least one opening,
wherein when the housing is mounted on the head mounted electronic device, the internal wire is electrically connected to a first electrode of the head mounted electronic device and the protrusion is electrically connected to a second electrode of the head mounted electronic device.

8. The lens clip of claim 7, wherein the lens clip further comprises:
a third electrode electrically connected to one end of the internal wire;
a fourth electrode electrically connected to an opposite end of the internal wire;
a first elastic member;
a first pogo pin protruding from the housing toward the first electrode under an elastic force of the first elastic member;
a second elastic member; and
a second pogo pin acting as the protrusion and protruding from the housing towards the at least one opening under an elastic force of the second elastic member.

9. The lens clip of claim 8, wherein, when the housing is mounted on the head mounted electronic device, the first pogo pin is pressed against the head mounted electronic device and thus is brought into contact with the first electrode and the third electrode.

10. The lens clip of claim 8, wherein when the user lens is inserted into the at least one opening, the second pogo pin is pressed against the user lens and thus is brought into contact with the second electrode and the fourth electrode.

11. The lens clip of claim 8, wherein the second pogo pin is electrically connected to the fourth electrode via the second elastic member.

12. The lens clip of claim 7, wherein the lens clip further comprises:
a third electrode electrically connected to an end of the internal wire;
an elastic member;
a lever electrically connected to an opposite end of the internal wire and protruding from the housing toward the at least one opening under an elastic force of the elastic member; and
a conductive bar electrically connected to a portion of the lever.

13. The lens clip of claim 12, wherein when the housing is mounted on the head mounted electronic device, the third electrode is brought into contact with the first electrode.

14. The lens clip of claim 12, wherein when the user lens is inserted into the at least one opening, the lever is pressed against the user lens such that the conductive bar is brought into contact with the second electrode.

15. A head mounted electronic device comprising:
a body;
a lens clip disposed on the body and including at least one opening defined therein, wherein the lens clip includes a plurality of protrusions protruding toward the opening;
an infrared-ray emissive device disposed the body and configured to emit an infrared-ray;
an infrared-ray imaging device disposed on the body opposite to the infrared-ray emissive device, wherein the infrared-ray imaging device acquires a first eyeball image obtained when infrared-ray emitting from the infrared-ray emissive device is reflected from an eyeball of a user; and
a processor operatively connected to the infrared-ray emissive device and the infrared-ray imaging device,
wherein the processor is configured to:
  transmit a plurality of first signals corresponding to the plurality of protrusions to the lens clip;
  determine whether a user lens is inserted into the opening, and a power range of the user lens based on a plurality of second signals received in response to the plurality of first signals;
  upon determination that the user lens is not inserted into the opening, execute an eye tracking algorithm, based on a first eyeball image; and
  upon determination that the user lens is inserted into the opening, execute the eye tracking algorithm, based on a second eyeball image, and wherein the second eyeball image is obtained by removing an additional reflected light image resulting from the user lens and based on the power range of the user lens from the first eyeball image.

16. The device of claim 15, wherein:
upon determination that the user lens is inserted into the opening, the processor is configured to determine the power range, based on a number, positions, or a combination thereof of specific protrusions among the plurality of protrusions, and
the first and second signals related to each of the specific protrusions are identical with each other.

17. The device of claim 16, wherein at least one protrusion pressed against the user lens among the plurality of protrusion outputs the second signal identical with the first signal.

18. The device of claim 15, wherein:
the device further comprises an auxiliary lens clip inserted into the lens clip,
the user lens is mounted on the auxiliary lens clip,
the auxiliary lens clip includes a plurality of recess structures corresponding to the plurality of protrusions,
each of the plurality of protrusions is pressed or not pressed against each of the plurality of recess structures, and
a pattern of at least one pressed protrusion indicates a power range of the user lens.

19. The device of claim 18, wherein each of the plurality of recess structures is constructed to be slidable into the auxiliary lens clip to form a recess.

* * * * *